(12) United States Patent
Salter et al.

(10) Patent No.: US 11,525,291 B2
(45) Date of Patent: Dec. 13, 2022

(54) DOOR SEALING AND TIMING MECHANISM FOR USE IN COACH DOOR CONFIGURATION FOR A VEHICLE

(71) Applicant: Ford Global Technologies, LLC, Dearborn, MI (US)

(72) Inventors: Stuart C. Salter, White Lake, MI (US); James J. Surman, Clinton Township, MI (US); David Brian Glickman, Southfield, MI (US); Kristopher Karl Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 389 days.

(21) Appl. No.: 16/775,879

(22) Filed: Jan. 29, 2020

(65) Prior Publication Data

US 2020/0308882 A1    Oct. 1, 2020

Related U.S. Application Data

(60) Provisional application No. 62/824,356, filed on Mar. 27, 2019.

(51) Int. Cl.
*B60J 5/04* (2006.01)
*E05B 83/38* (2014.01)
*B60J 10/86* (2016.01)

(52) U.S. Cl.
CPC ............. *E05B 83/38* (2013.01); *B60J 5/0479* (2013.01); *B60J 10/87* (2016.02); *E05Y 2900/531* (2013.01)

(58) Field of Classification Search
CPC .......... B60J 10/87; B60J 5/0479; E05B 83/38
See application file for complete search history.

(56) References Cited

U.S. PATENT DOCUMENTS

| | | | | |
|---|---|---|---|---|
| 7,488,029 B2* | 2/2009 | Lechkun | ................. | B60J 5/0479 296/146.1 |
| 8,342,592 B2* | 1/2013 | Konchan | .................. | B60J 10/24 16/334 |
| 10,337,227 B2* | 7/2019 | Stoof | ....................... | E05D 15/58 |

FOREIGN PATENT DOCUMENTS

FR          3101025 A3 *  3/2021
WO    WO-2018137738 A1 *  8/2018  ............. E05B 81/20

* cited by examiner

*Primary Examiner* — Joseph D. Pape
(74) *Attorney, Agent, or Firm* — Vichit Chea; Price Heneveld LLP

(57) ABSTRACT

A vehicle includes a body having an uninterrupted side aperture that provides access to an interior passenger cabin. A front door is hingedly attached at a forward edge of the uninterrupted side aperture. The front door is selectively operable between front open and front closed positions. A rear door is hingedly attached at a rearward edge of the uninterrupted side aperture. The rear door is selectively operable between rear open and rear closed positions. A latching assembly is at least partially positioned within the body and configured to receive the front door in the front closed position and the rear door in the rear closed position. A sealing assembly is defined between a forward seal of the rear door and a rearward seal of the front door. The forward and rearward seals engage one another in a fully-closed position.

20 Claims, 21 Drawing Sheets

DOOR SEALING AND TIMING MECHANISM FOR USE IN COACH DOOR CONFIGURATION FOR A VEHICLE

CROSS-REFERENCE TO RELATED APPLICATION

This application claims priority to and the benefit under 35 U.S.C. § 119(e) of U.S. Provisional Patent Application No. 62/824,356, filed on Mar. 27, 2019, entitled "DOOR SEALING AND TIMING MECHANISM FOR USE IN COACH DOOR CONFIGURATION FOR A VEHICLE," the entire disclosure of which is hereby incorporated herein by reference.

FIELD OF THE INVENTION

The present invention generally relates to vehicle doors, and more specifically, coach-style vehicle doors that include a door sealing mechanism and a timing mechanism that provides for a vehicle body configuration having no pillar between the coach-style doors.

BACKGROUND OF THE INVENTION

Within certain vehicles, vehicle doors are disposed on each side of the vehicle body. Typically, with sedan-type vehicles, the body includes a front door and a rear door on each side of the vehicle. These front and rear doors can be configured in a coach-style configuration, where the front door has a front hinge and the rear door has a rear hinge. This configuration of doors allows for the front and rear doors to open opposite from one another, so that a large opening is provided for at the side of the vehicle. These coach-style doors are currently used within pick-up trucks and certain luxury vehicles. Typically, the B-pillar is positioned between the front and rear doors and each of the front and rear doors latch to an area within the B-pillar.

SUMMARY OF THE INVENTION

According to one aspect of the present invention, a vehicle includes a body having an uninterrupted side aperture that provides access to an interior passenger cabin. A front door is hingedly attached at a forward edge of the uninterrupted side aperture. The front door is selectively operable between front open and front closed positions. A rear door is hingedly attached at a rearward edge of the uninterrupted side aperture. The rear door is selectively operable between rear open and rear closed positions. A latching assembly is at least partially positioned within the body and configured to receive the front door in the front closed position and the rear door in the rear closed position. A sealing assembly is defined between a forward seal of the rear door and a rearward seal of the front door. The forward and rearward seals engage one another in a fully-closed position.

Embodiments of this aspect of the invention can include any one or combination of the following features:
  the front door is operable between the front open and front closed positions when the rear door is in the rear closed position
  the rear door is operable between the rear open and rear closed positions when the front door is in the front closed position
  the latching assembly is further defined within the forward edge of the rear door and the rearward edge of the front door
  the sealing assembly includes an operable member that articulates toward a receiving seal to define the fully-closed position
  the operable member is operated by a mechanical assembly
  the operable member is operated by a magnetic assembly
  the sealing assembly includes opposing elastomeric seals that are attached to the front and rear doors, respectively
  the front and rear doors are operated by a door operating mechanism that operates the front door, the rear door and the latching assembly between an ajar position and the fully-closed position
  the ajar position is approximately 5 degrees rotationally distal from the fully-closed position
  the mechanical door operating mechanism includes the latching assembly According to another aspect of the present invention, a vehicle includes a body having an uninterrupted side aperture that provides access to an interior passenger cabin. A front door is operably attached at a forward portion of the uninterrupted side aperture. The front door is selectively operable between front open and front closed positions. A rear door is operably attached at a rearward portion of the uninterrupted side aperture. The rear door is selectively operable between rear open and rear closed positions. A latching assembly is at least partially positioned within the body and configured to receive the front door in the front closed position and the rear door in the rear closed position. A sealing assembly is defined between a forward seal of the rear door and a rearward seal of the front door. Forward and rearward seals engage one another in a fully-closed position.

Embodiments of this aspect of the invention can include any one or combination of the following features:
  the front door is rotationally coupled with a forward edge of the uninterrupted side aperture
  each of the front and rear doors are independently and selectively operable between the front open and front closed positions and the rear open and rear closed positions, respectively
  the sealing assembly includes an operable member that articulates toward a receiving seal to define the fully-closed position
  the operable member is at least partially operated by a mechanical assembly disposed within one of the front and rear doors
  the operable member is at least partially operated by a magnetic assembly disposed within one of the front and rear doors According to another aspect of the present invention, a vehicle includes a body having an uninterrupted side aperture that provides access to an interior passenger cabin. A front door is hingedly attached at a forward edge of the uninterrupted side aperture. The front door selectively operable between front open and front closed positions. A rear door is operably attached at a rearward portion of the uninterrupted side aperture. The rear door is selectively operable between rear open and rear closed positions. A latching assembly is positioned within the body and the front and rear doors. The latching assembly is operable to receive the front door in the front closed position and the rear door in the rear closed position. A sealing assembly is defined between a forward seal of the rear door and a rearward seal of the front door. The forward and rearward seals engage one another in a fully-closed position. The latching assembly selectively operates the front and rear doors between respective ajar positions and the fully-closed position.

Embodiments of this aspect of the invention can include any one or combination of the following features:
- each of the front and rear doors are independently and selectively operable between the front open and front closed positions and the rear open and rear closed positions, respectively
- the sealing assembly includes an operable member that articulates toward a receiving seal to define the fully-closed position, and wherein the operable member is operated by at least one of a mechanical assembly and a magnetic assembly, and wherein the operable member is disposed within one of the front and rear doors These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
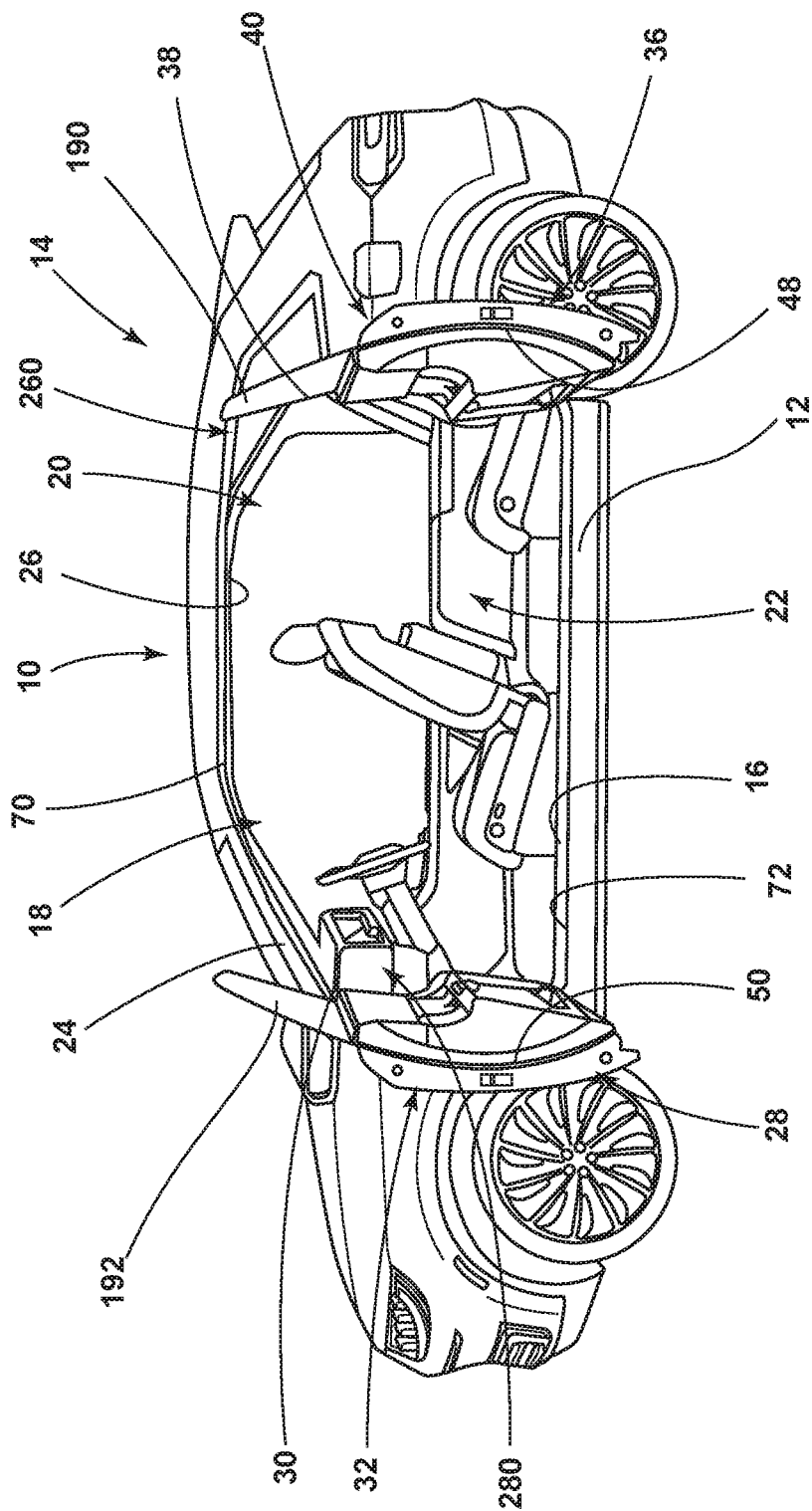
FIG. 1 is a side perspective view of a vehicle including coach-style doors shown in an open position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-18, reference numeral 10 generally refers to a pair of coach-style doors that are operably coupled to a frame 12 for a vehicle 14 for any one or more of rotational, translational, sliding or other operable movement. The coach-style doors 10 rotate opposite to one another to provide a single access aperture 16 through which front and rear portions 18, 20 of the passenger cabin 22 can be accessed. According to various aspects of the device, the vehicle 14 can include a body 24 and frame 12 having an uninterrupted side aperture 26 that provides access to the interior passenger cabin 22. A front door 28 of the coach-style doors 10 is hingedly attached at a forward edge 30 or forward portion of the uninterrupted side aperture 26. The front door 28 is selectively operable between front open and front closed positions 32, 34. A rear door 36 of the pair of coach-style doors 10 is hingedly attached at a rearward edge 38 or rearward portion of the uninterrupted side aperture 26. The rear door 36 is selectively operable between rear open and rear closed positions 40, 42. For operating the coach-style doors 10, a latching assembly 44 is at least partially positioned in engagement with the body 24 and is configured to receive the front door 28 in the front closed position 34 and the rear door 36 in the rear closed position 42. A sealing assembly 46 is defined between a forward seal 48 of the rear door 36 and a rearward seal 50 of the front door 28. In this manner, the forward and rearward seals 48, 50 engage one another in a fully-closed position 52 of the coach-style doors 10. One or both of the front and rear doors 28, 36 can also be slidably attached to the frame 12 at the uninterrupted side aperture 26.

According to various aspects of the device, the coach-style doors 10 can be independently operable with respect to one another, such that each of the front and rear doors 28, 36 can be opened, while the other of the front and rear doors 28, 36 remains in the front closed or rear closed positions 34, 42, respectively. It is also contemplated that the front door 28 may overlap the rear door 36. In this configuration, the rear door 36 can only be opened when the front door 28 is moved into the front open position 32 or a rear door clear position 60, which will be described more fully below.

Figure 2:
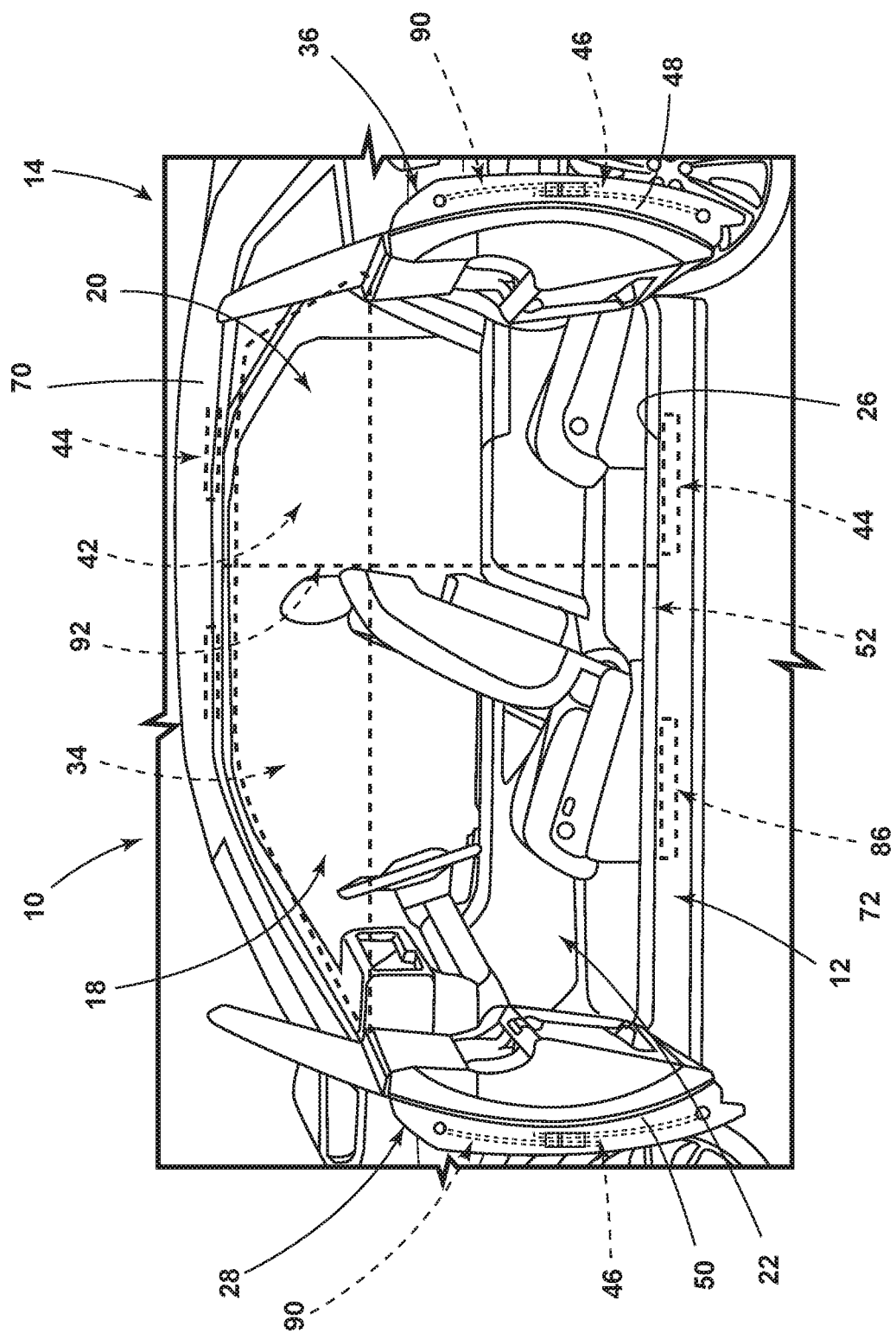
FIG. 2 is an enlarged side perspective view of the vehicle of FIG. 1.

As exemplified in FIGS. 1 and 2, the body 24 of the vehicle 14 includes the uninterrupted side aperture 26 that does not include a central pillar, commonly referred to as a B-pillar, that divides the side aperture 26. Accordingly, when the front and rear doors 28, 36 are in the front open and rear open positions 32, 40, each of the front and rear portions 18, 20 of the passenger cabin 22 can be accessed via the uninterrupted side aperture 26 defined within the body 24 of the vehicle 14. Accordingly, no central B-pillar is included within the vehicle 14. Accordingly, for securing the front and rear doors 28, 36 in the front closed and rear closed positions 34, 42, respectively, the front and rear doors 28, 36 are required to couple to the top and/or bottom edges 70, 72 of the side aperture 26. Additionally, the front and rear doors 28, 36 may couple with one another to define the fully-closed position 52. Using the latching assembly 44, the selective coupling of the front and rear doors 28, 36 with the top and/or bottom edges 70, 72 of the side aperture 26 and with one another can be described as cinching, latching, securing, holding, locking or otherwise attaching the front and rear doors 28, 36 relative to the frame 12 of the vehicle 14.

Figure 3:
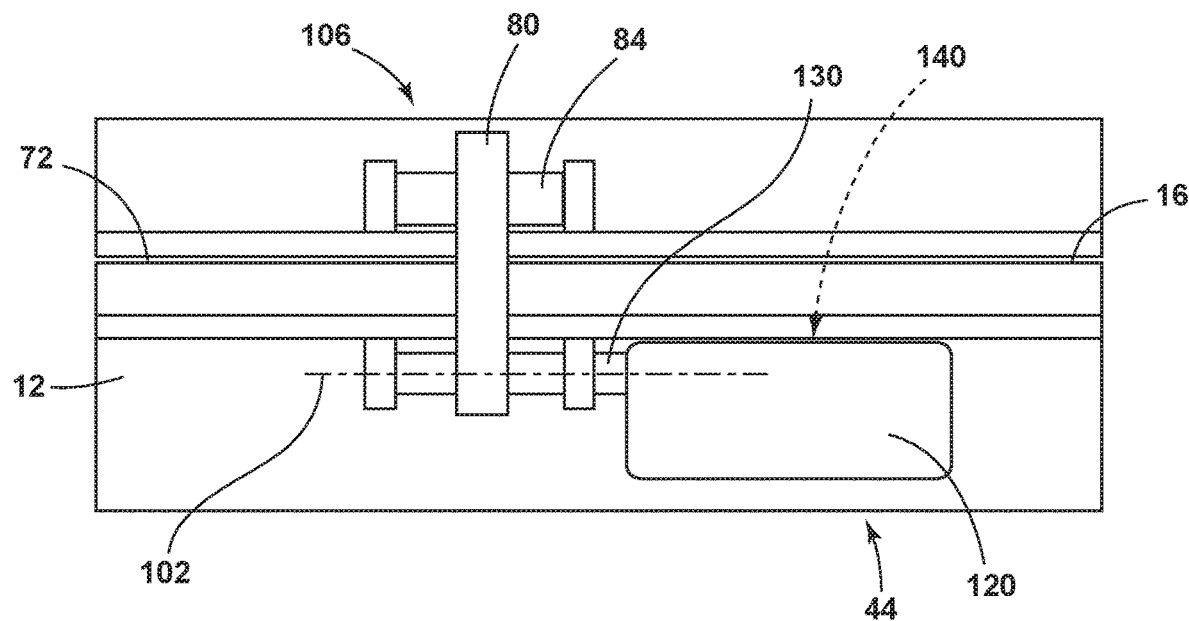
FIG. 3 is a schematic plan view of a latching assembly for the coach-style doors that can be attached to a portion of the vehicle frame.
Figure 4:
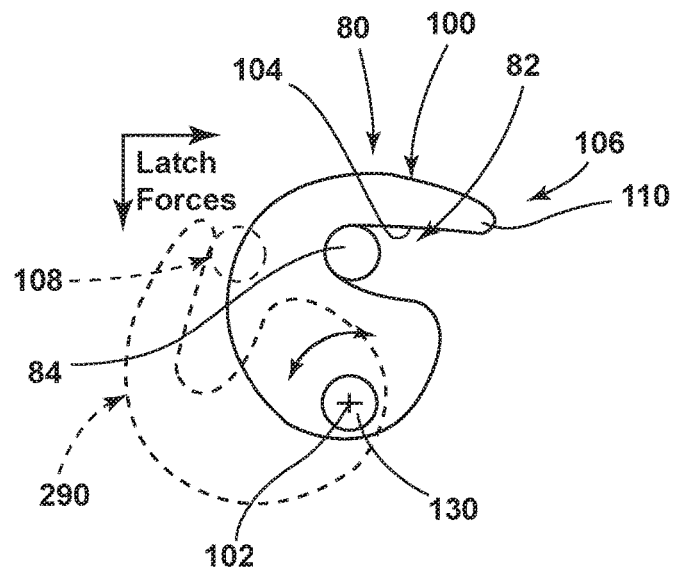
FIG. 4 is a schematic cross-sectional view of an exemplary latch for securing the coach-style doors in a closed position.
Figure 5:
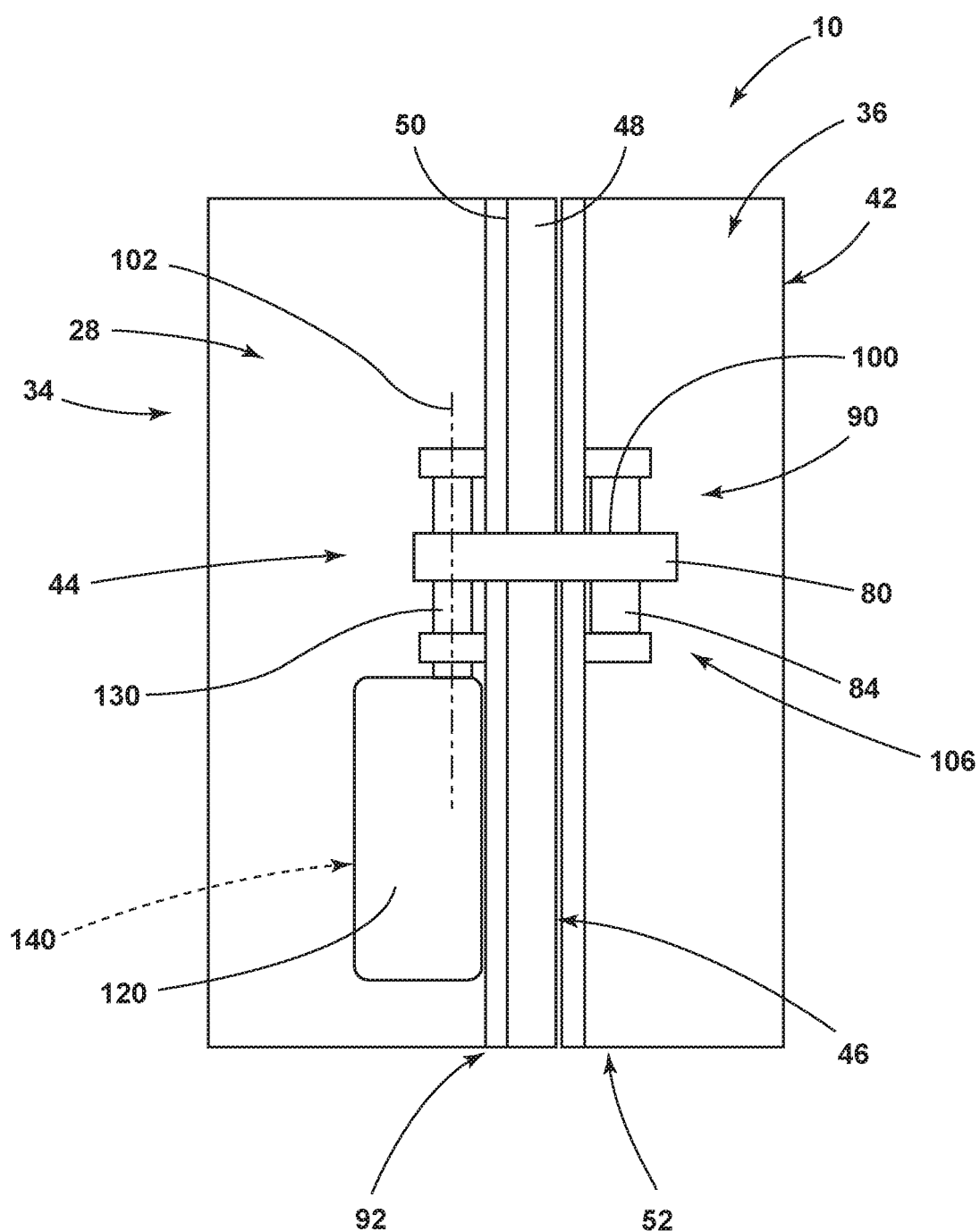
FIG. 5 is a schematic elevational view of a vertically positioned latch assembly that can be engaged between the front and rear doors.

Referring now to FIGS. 3-5, the latching assembly 44 for the vehicle 14 can include a motorized assembly that rotationally operates a locking cam 80 that includes a locking recess 82. When the front door 28 or the rear door 36, or both, are moved into the respective closed positions, the locking cam 80 can rotate about a rotational axis 102 to connect with a catch pin 84 that is defined within the front and rear doors 28, 36. It is contemplated that each of the front and rear doors 28, 36 can include a corresponding locking cam 80 that attaches with a respective catch pin 84 positioned within each of the front and rear doors 28, 36. Through this configuration, each of the front and rear doors 28, 36 can be moved into the respective front closed and rear closed positions 34, 42, independently of one another. Where a driver 242 or front passenger requires access to the front portion 18 of the passenger cabin 22, a front section 86 of the latching assembly 44 can disengage from the catch pin 84 of the front door 28. Once disengaged, the front door 28 can be moved to the front open position 32 to provide for access to the front portion 18 of the passenger cabin 22. The opposite is true of the rear door 36, for accessing the rear portion 20 of the passenger cabin 22. Again, each of the front and rear doors 28, 36 are typically configured to be independently operable with respect to one another.

Referring again to FIGS. 3 and 4, according to various aspects of the device, the latching assembly 44 that is coupled with the body 24 of the vehicle 14 at the side aperture 26 can be positioned at each of the top and bottom edges 70, 72 of the side aperture 26. Accordingly, when the front door 28 is moved to the front closed position 34 or the rear door 36 is moved to the rear closed position 42, the latching assembly 44 couples with each of the front and rear doors 28, 36 at top and bottom edges 70, 72 of each of the side apertures 26. It should be understood that in various aspects of the device, the latching assembly 44 may include only a latching assembly 44 at the top or bottom edges 70, 72 of the side aperture 26.

As exemplified in FIG. 5, the latching assembly 44 can include a door securing latch 90 that is positioned to extend between the central seam 92 defined between the front and rear doors 28, 36. In various aspects of the device, the door securing latch 90 can be positioned proximate the forward seal 48 of the rear door 36. In this configuration, the locking cam 80 of the operable door securing latch 90 can attach with a catch pin 84 that is defined near the rearward seal 50 of the front door 28. It should be understood that the operable door securing latch 90 can be coupled near the rearward seal 50 of the front door 28 and the catch pin 84 can be defined near the forward seal 48 of the rear door 36. The operable door securing latch 90 can operate in combination with the other portions of the latching assembly 44 that are positioned within the top and bottom edges 70, 72 of the side aperture 26 for the body 24 of the vehicle 14. Accordingly, each door may be secured in the fully-closed position 52 at four points around the perimeter of the front and rear doors 28, 36. These connection points can be the respective hinges, the latching assemblies 44 positioned at the top and bottom edges 70, 72 of the side aperture 26 and the door securing latch 90 positioned at the seam 92 where the front and rear doors 28, 36 meet in the fully-closed position 52.

Referring again to FIGS. 3-5, the locking cam 80 can include a latching portion 100 that rotates about the rotational axis 102 of the locking cam 80. This latching portion 100 can include a biasing surface 104 that serves to pull, cinch or otherwise draw the catch pin 84 toward the rotational axis 102 as the locking cam 80 moves toward a latched position 106. Through this operation, the locking cam 80 can be utilized for moving each of the front and rear doors 28, 36 from an ajar position 108 (typically approximately 5 degrees rotationally distal from the fully-closed position 52) to the respective front closed and rear closed positions 34, 42 of the front and rear doors 28, 36, respectively. Accordingly, by placing the front and rear doors 28, 36 near the respective front closed and rear closed positions 34, 42, the latching assembly 44 can provide a function for fully closing the coach-style doors 10. The biasing surface 104 of the locking cam 80 can include a generally curved configuration that is able to receive the catch pin 84 when the front or rear door 28, 36 is positioned near the respective front closed and rear closed positions 34, 42, typically the ajar position 108. An extending member 110 can be used to engage the catch pin 84. This extending member 110 defines a portion of the curved biasing surface 104 that is adapted to bias the catch pin 84 and the remainder of the front or rear door 28, 36 to the front closed and rear closed positions 34, 42, respectively.

In certain aspects of the device, as exemplified in FIGS. 3-5, each of the front and rear doors 28, 36 can be manually operable to any one of the front open and rear open positions 32, 40 and the ajar position 108. The front and rear doors 28, 36 can then be automatically operable between the ajar position 108 and the front closed and rear closed positions 34, 42. In such an embodiment, the user of the vehicle 14 can manually close the front and/or rear doors 28, 36 to the ajar position 108, at which point the latching assembly 44 and the sealing assembly 46 can manipulate the front and rear doors 28, 36 from the ajar position 108 to the front closed and rear closed positions 34, 42. Conversely, when it is desired for one or both of the front and rear doors 28, 36 to be opened, the latching assembly 44 and the sealing assembly 46 can manipulate the front and rear doors 28, 36 from the front closed and rear closed positions 34, 42 to the ajar position 108. Once in the ajar position 108, the user can manually operate one or both of the front and rear doors 28, 36. It is also contemplated that the front and rear doors 28, 36 can be operated by a door operating mechanism that can operate the front and rear doors 28, 36 door at least between the front open and rear open positions 32, 40 and the ajar position 108.

In order to place the front door 28 and/or the rear door 36 into the ajar position 108, it can be important to ascertain whether the opposing door of the front and rear doors 28, 36 are opened or closed. Studies have shown that, for example, where the rear door 36 is closed, it can require more rotational force or velocity to move the front door 28 into the ajar position 108 so that the latching assembly 44 can move the front door 28 into a fully-closed position 52. If insufficient force or velocity is applied to the front door 28, the front door 28 may not achieve the ajar position 108 and the latching assembly 44 may be unable to manipulate the front door 28. With this information in mind, where the front and rear doors 28, 36 are operated by a door operating mechanism, the door operating mechanism can be configured to apply different rotational force and/or rotational velocity for the front and rear doors 28, 36 depending on the position of the opposing door of the front and rear doors 28, 36.

In addition, the door operating mechanism may be coupled with various sensors that can adjust the operation of the door operating mechanism to account for various environmental factors. Such factors may include, but are not limited to, the slope on which the vehicle is located, wind speed, temperature, and other factors. In addition, it is contemplated that the door operating mechanism can operate as a supplemental system for assisting a manual operation of the front and rear doors 28, 36. In such an embodiment, the door operating mechanism may detect a rotational force and/or velocity of the front and rear doors 28, 36 applied by a manual operation. The door operating mechanism may detect an insufficient force or velocity. In this instance, the door operating mechanism may provide a supplemental force so that the front and rear doors 28, 36 can achieve the ajar position 108. Alternatively, if manual operation of the front and rear doors 28, 36 results in an excessive force or velocity, typically indicative of a "slam" of the door, the door operating mechanism can apply an opposing rotational force to slow rotation of the front and rear doors 28, 36 to the ajar position 108. This opposing force applied to the front and rear doors 28, 36 may also be implemented where an obstruction is present between one of the front and rear doors 28, 36 and the body 24 of the vehicle 14.

According to various aspects of the device, the door operating mechanism for the front and rear doors 28, 36 can include one or more sensors that are used to detect a complete or incomplete closure of at least one of the front and rear doors 28, 36. Where the rear door 36 is not properly closed, the front door 28 can be configured to prevent a full closure until the rear door 36 is placed in the ajar position 108 or the rear closed position 42, or vice versa with respect to the front door 28.

As exemplified in FIGS. 3-5, a motor 120 can be used to rotationally operate the locking cam 80 to engage and disengage the catch pin 84 to secure the front and rear doors 28, 36 in the respective closed positions, and also release the front and rear doors 28, 36 to allow the front and rear doors 28, 36 to move to the front open and rear open positions 32, 40, respectively. It is contemplated that the locking cam 80 is configured to be substantially hidden within the front and rear doors 28, 36, or within the body 24 of the vehicle 14 in an area near the front and rear doors 28, 36. The only visible portion of the latching assembly 44 is typically the extending member 110 of the locking cam 80 that is adapted to engage the catch pin 84. Again, the catch pin 84 can be positioned on one of the body 24 of the vehicle 14 or each of the coach-style doors 10. The motorized assembly for the latching assembly 44 that includes the locking cam 80 can be positioned on the other of the coach-style doors 10 or the body 24 of the vehicle 14.

By using the latching assembly 44 having the locking cam 80, the front and rear doors 28, 36 can be secured to the body 24 of the vehicle 14 in the fully-closed position 52. This fully-closed position 52 is configured to promote sufficient structural integrity for the vehicle 14.

According to various aspects of the device, the latching assembly 44 can include a single locking cam 80 that rotates about a rotational axis 102. In various aspects of the device, the motor 120 for the latching assembly 44 can operate a drive shaft 130 that is connected with multiple locking cams 80. These multiple locking cams 80 can be configured to engage a single elongated catch pin 84 or multiple corresponding catch pins 84 for moving the front and rear doors 28, 36 into the respective closed position. The particular design of the number of the locking cams 80 and catch pins 84 can vary depending upon the configuration of the vehicle 14 and the structural needs for the particular vehicle 14.

It should be understood that the latching assembly 44 can incorporate various alternative latching mechanisms. These latching mechanisms can include various hook-type members and other alternatively shaped cam locks that can be used to secure the front and rear doors 28, 36 to one another and also secure the front and rear doors 28, 36 to the body 24 of the vehicle 14. It is also contemplated that the motor 120 for operating the cam locks can include various motor types. These motor types can include, but are not limited to, geared motors, servo motors, stepper motors, screw-drive motors, and other similar drive mechanisms. It is also contemplated that in certain aspects of the device, the locking cam 80 may be operated manually through interior and exterior latches that are coupled with the front and rear doors 28, 36 for the vehicle 14.

According to various aspects of the device, it is contemplated that when the latching assembly 44 is moved to the latched position 106 for securing at least one of the front and rear doors 28, 36, a separate locking mechanism can be engaged to define a locked position 140 of the front door 28, rear door 36, or both. In this manner, the latching assembly 44 may be utilized for moving the front and rear doors 28, 36 into the latched position 106. This position may or may not be indicative of a locked position 140. A locking mechanism may be coupled with the latching assembly 44 such that a separate mechanical lock may be utilized for securing the locking cam 80 in the latched position 106. Accordingly, the motor 120 for the latching assembly 44 may be disengaged and the mechanical lock can be utilized for defining a locked position 140 of the front door 28, rear door 36 or both. Additionally, a separate lock, separate from the latching assembly 44 can be utilized for defining a locked position 140 of the front and rear doors 28, 36. This locking mechanism may be in the form of an electrical lock, mechanical lock, magnetic lock, or other similar locking mechanism that can be used to secure the front and rear doors 28, 36 in the front closed and rear closed positions 34, 42, respectively.

In certain aspects of the device, activation of the locking mechanism can automatically disengage the latching assembly 44. In such an embodiment, engagement of the locking mechanism can prevent operation of the latching assembly 44 via an electrical and/or mechanical disengagement of the motor 120. When the locking mechanism is disengaged, the latching assembly 44 can be activated so that at least one of the front and rear doors 28, 36 can be operated toward the ajar position 108. Operation of the locking mechanism and the latching assembly 44 can be accomplished via various user interfaces that may be located on an inside of the vehicle 14, on the outside of the vehicle 14 or on a separate location, such as on a portable computing device.

Referring now to the various aspects of the device exemplified in FIGS. 6-18, various sealing assemblies 46 can be included within the coach-style doors 10 for sealing the seam 92 defined between the front and rear doors 28, 36 in the fully-closed position 52. This seam 92 can take the form of a stagnant or static seal 150 that can be engaged when the doors are moved into the fully-closed position 52. Various operable sealing mechanisms 152 having operable members can also be utilized for engaging or disengaging the sealing mechanism 152 at the seam 92 between the front and rear doors 28, 36.

Figure 6:
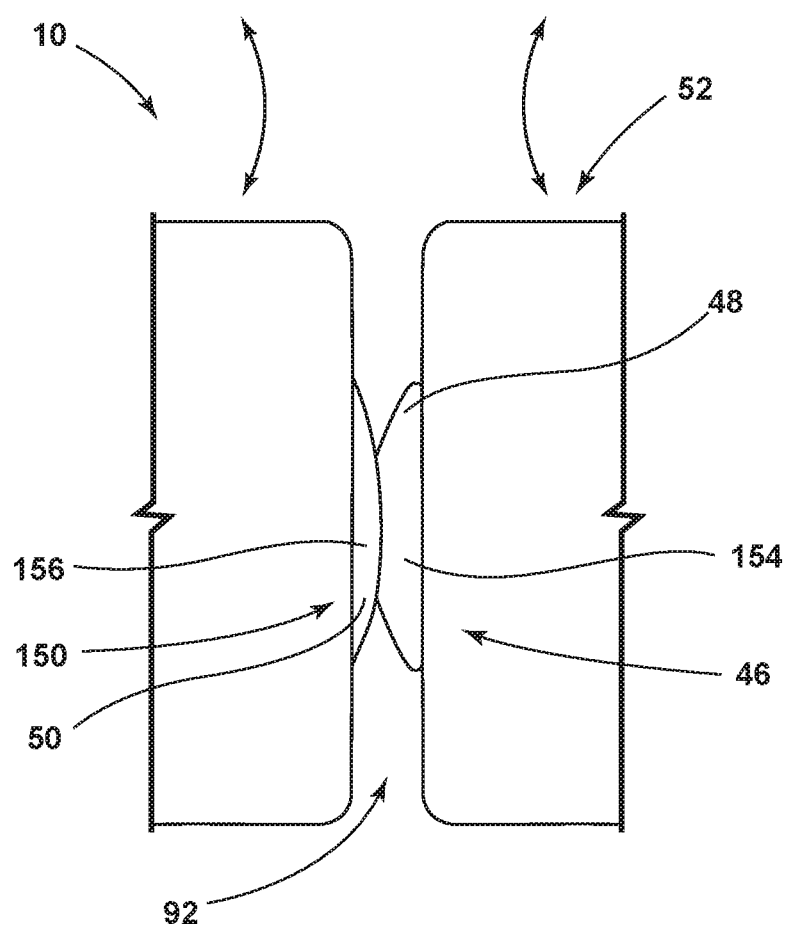
FIG. 6 is a schematic cross-sectional view of a sealing assembly for the coach-style doors that are shown in the closed position.
Figure 7:
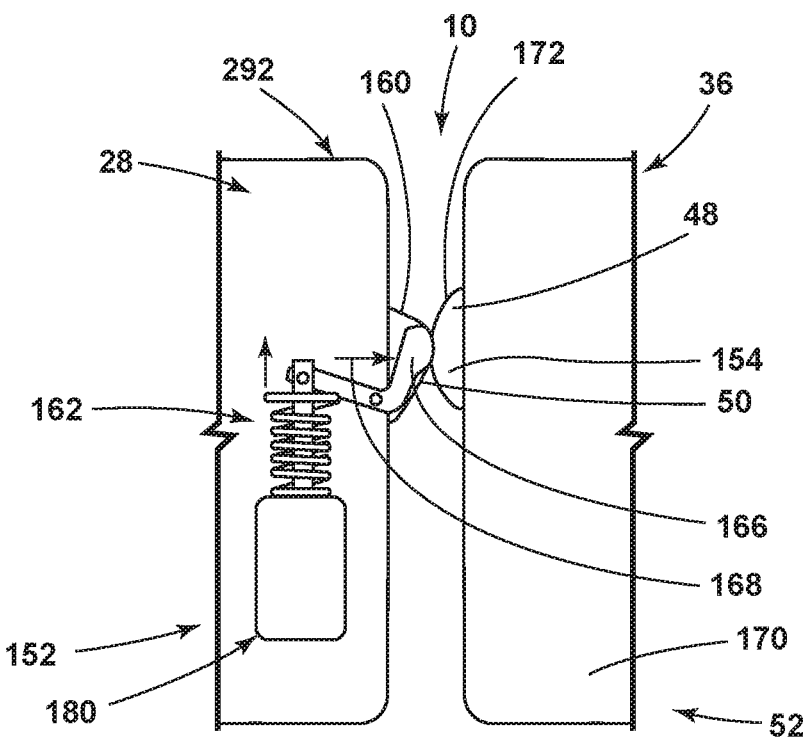
FIG. 7 is a schematic cross-sectional view of an operable sealing assembly for the coach-style doors shown in a rest position.
Figure 8:
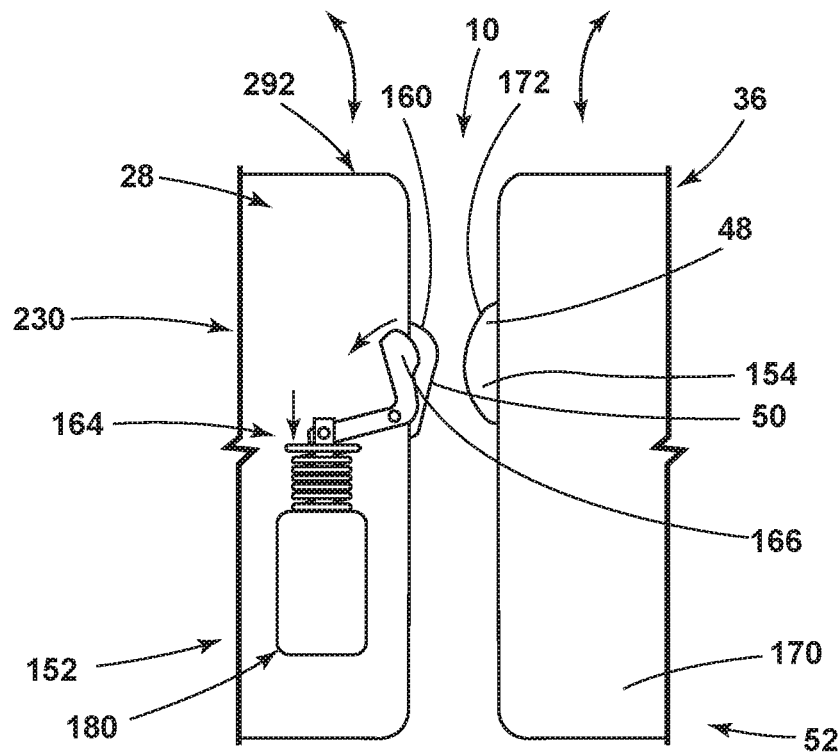
FIG. 8 is a schematic cross-sectional view of the operable sealing assembly of FIG. 7 shown in an actuated position for moving at least one of the front and rear doors to an open position.

As exemplified in FIG. 6, a static seal 150 can include a forward seal 48 of the rear door 36 and a rearward seal 50 of the front door 28. In the static seal 150, one or both of the seal members can include an elastomeric seal member, such as a weatherstrip 154. In certain aspects of the device, the static seal 150 can include an elastomeric seal or weatherstrip 154, and the other sealing member can include a robust or sturdy substrate 156 that can engage the weatherstrip 154. By way of example, and not limitation, the static seal 150 can include the robust contact substrate 156 that engages the weatherstrip 154 when the front and rear doors 28, 36 are in the fully-closed position 52. This configuration allows for a slidable engagement between the weatherstrip 154 and the robust contact substrate 156. The substrate 156 can include any material that provides a hard, smooth and substantially non-corrosive surface for the resilient weatherstrip 154 to engage and slide over. The substrate 156 is configured to reduce friction against the weatherstrip 154 and limit visual indications of wear over time as the weatherstrip 154 slides against the substrate 156. Accordingly, operation of the front and rear doors 28, 36 between the fully-closed position 52 and one of the front open and rear open positions 32, 40 will provide for a slidable engagement between the weatherstrip 154 and the robust contact substrate 156, which can be a stainless steel material. This slidable engagement can minimize wear and tear on the weatherstrip 154 during use. In various aspects of the device, the static seal 150 can include opposing weatherstrips 154 that are each attached to the front and rear doors 28, 36. It is contemplated that the static seal 150 can be similar to that used in conventional doors where a seal or gasket 214 that extends around the perimeter of a door for a vehicle 14 engages a metallic frame 12 that surrounds the front and rear doors 28,36 in a fully-closed position 52. Where the opposing weatherstrips 154, or opposing elastomeric seals, are used, the various operating mechanisms of the front and rear doors 28, 36 can include variations in the rotational force or velocity depending on the rotational position of the opposing door 170, as discussed herein.

Referring now to FIGS. 7-10, the sealing assembly 46 can include a mechanical assembly in the form of an operable sealing mechanism 152 that can manipulate a flexible seal 160 between a rest position 162 and an actuated position 164. In the rest position 162, an actuator 166 biases a flexible seal 160 in an outward direction 168 to engage a weatherstrip 154 that is attached to the opposing door 170 of the coach-style doors 10. Accordingly, the rest position 162 is typically indicative of the fully-closed position 52 of the coach-style doors 10. When one or both of the front and rear doors 28, 36 are going to be operated to the front open and rear open positions 32, 40, the actuator 166 can be operated to an actuated position 164. In this actuated position 164, the flexible seal 160 is moved away from the weatherstrip 154 of the opposing door 170. By actuating the flexible seal 160 away from the weatherstrip 154, no slidable engagement is contemplated between the flexible seal 160 and the weatherstrip 154 as the front and rear doors 28, 36 are operated toward the respective front open and rear open positions 32, 40.

Figure 9:
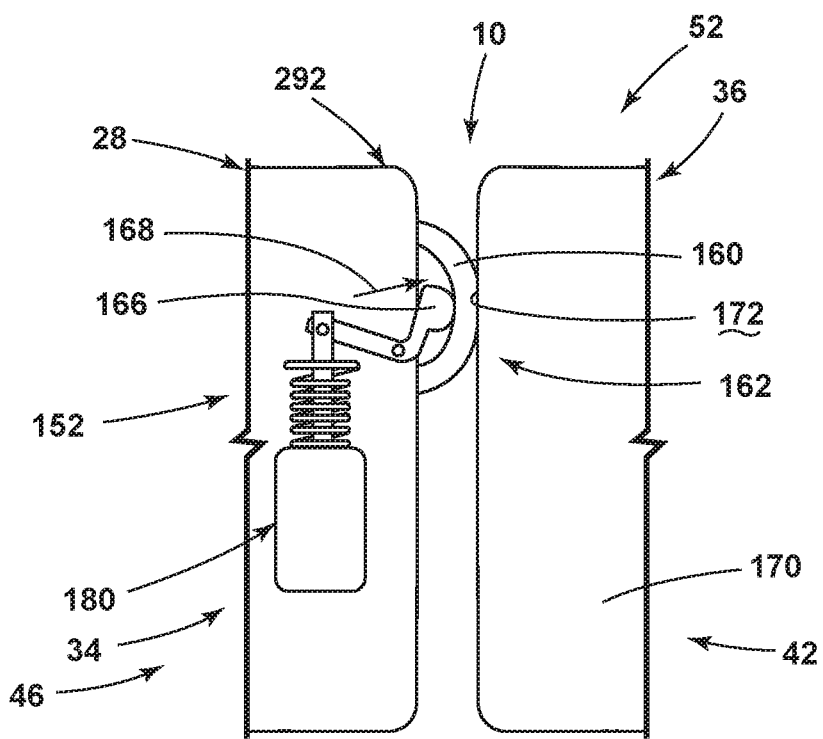
FIG. 9 is a schematic cross-sectional view of an operable sealing assembly for the coach-style doors shown in a rest position.
Figure 10:
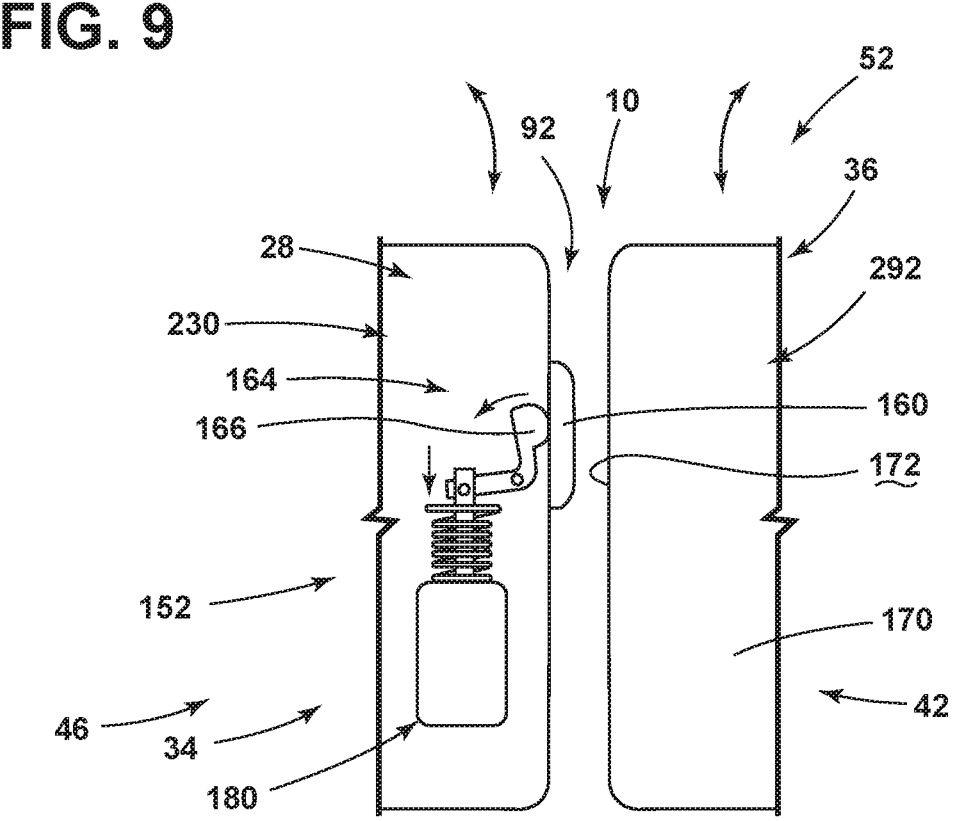
FIG. 10 is a schematic cross-sectional view of the operable sealing assembly of FIG. 9 shown in an actuated position for moving at least one of the front and rear doors to an open position.
Figure 11:
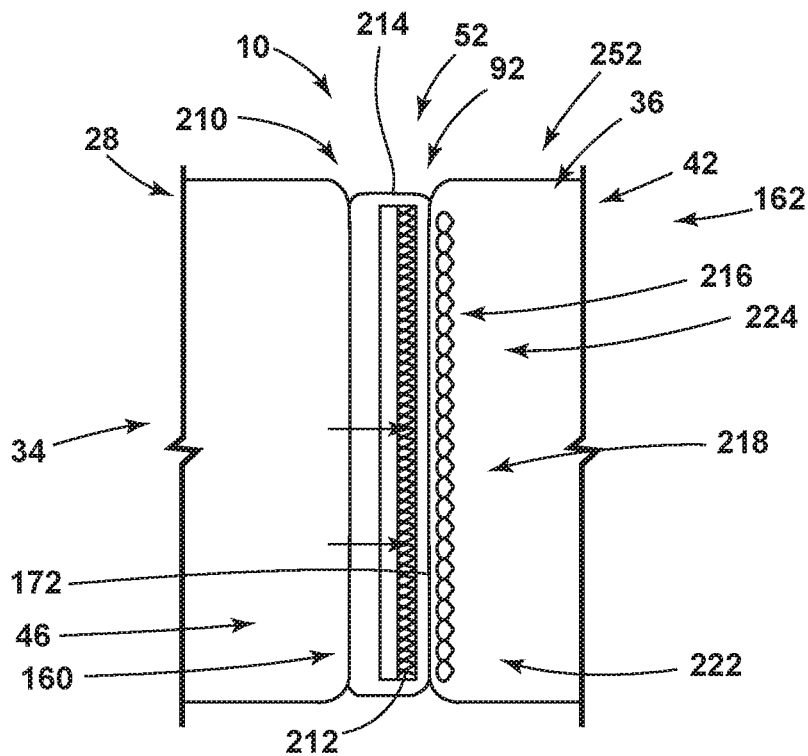
FIG. 11 is a schematic cross-sectional view of an operable magnetic seal shown in a sealed position when the doors are in a closed position.
Figure 12:
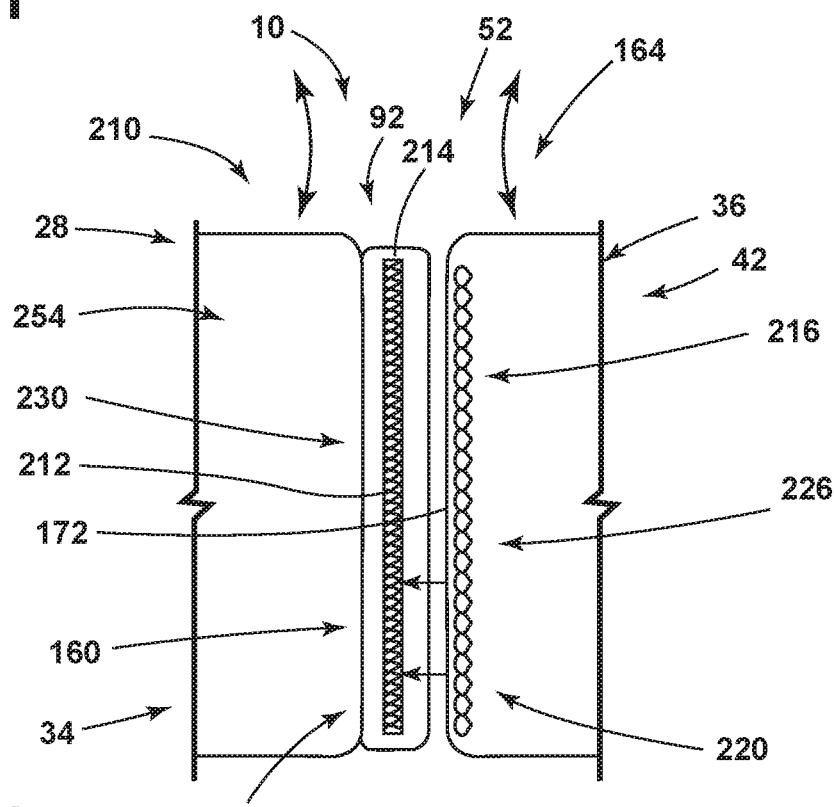
FIG. 12 is a schematic cross-sectional view of the operable magnetic sealing assembly of FIG. 11 shown in an actuated position for moving one of the front and rear doors to an open position.

In various aspects of the device, the flexible seal 160 can be manipulated by the actuator 166 to engage the weatherstrip 154 or, as exemplified in FIGS. 9 and 10, can be actuated to engage a receiving surface 172 of the opposing door 170 of the coach-style doors 10. In each of these configurations, the rest position 162 of the actuator 166 is defined by the flexible seal 160 engaging a portion of the opposing door 170. Again, this portion of the opposing door 170 can be a weatherstrip 154 or the receiving surface 172 of the opposing door 170 itself. Additionally, movement of the actuator 166 to the actuated position 164 serves to separate the flexible seal 160 from a portion of the opposing door 170.

As exemplified in FIGS. 7-10, the actuator 166 for manipulating the flexible seal 160 can be in the form of a piston member 180 that typically rotates the actuator 166. Accordingly, the actuator 166 is utilized for biasing the flexible seal 160 toward or away from the opposing door 170 of the coach-style doors 10. It is contemplated that various alternative actuating mechanisms can be utilized within the mechanically operable sealing mechanism 152. Such operating mechanisms can include, but are not limited to, geared-type mechanisms, servo motors, geared motors, other motorized configurations, inflatable and deflatable seals (as exemplified in FIGS. 27-30) and other similar configurations.

As exemplified in FIGS. 7-10, the mechanically operable sealing mechanism 152 can include an actuator 166 that extends along the length of the seam 92 between the front and rear doors 28, 36. Additionally, the actuator 166 can be in the form of multiple individual actuators 166 that can move portions of the flexible seal 160 toward and away from the opposing door 170. In each of these embodiments, the flexible seal 160 is operated along the entire seam 92 between the front and rear doors 28, 36. Accordingly, through the use of the actuator 166 and the flexible seal 160, the seam 92 between the front and rear doors 28, 36 can be substantially entirely sealed when in the fully-enclosed position.

As exemplified in FIGS. 7-10, the use of the flexible seal 160, while providing for an engagement surface that extends toward and away from the opposing door 170 of the coach-style doors 10, also provides a covering that conceals the operable mechanism for moving the actuator 166 between the rest position 162 and the actuated position 164. The flexible seal 160 also encloses and substantially seals the locking mechanism and the interior cavity of the coach-style doors 10 from water and dirt ingress. In this manner, the flexible seal 160 can be in the form of a continuous gasket 214 that extends substantially the entire height of the front door 28 or the rear door 36, depending upon the placement of the actuator 166.

For providing a sealing engagement 224 at the seam 92 between the front and rear doors 28, 36, the mechanical sealing assembly 292 can include an elongated actuator 166 that can be manipulated between the rest and actuated positions 162, 164. This elongated actuator 166 can be relatively small in size to provide for the operable engagement of the flexible seal 160 within upper portions 190 of the door, such as near the window 192 of the front and rear doors 28, 36 (shown in FIG. 2). In this configuration, a single actuator 166 or multiple actuators 166 can be activated to move the elongated actuator 166 between the rest and the actuated positions 162, 164. This elongated actuator 166, in turn, can engage the flexible seal 160 to move the flexible seal 160 toward and away from the opposing door 170 of the coach-style doors 10.

Referring now to FIGS. 11-18, the sealing assembly 46 can also include a magnetic sealing assembly 210 that can be actuated by one or more magnetic members 212 that operate to move a gasket 214 or the flexible seal 160 between the rest position 162 and the actuated position 164. As exemplified in FIGS. 11 and 12, a flexible seal 160 can be attached to one of the front and rear doors 28, 36. This flexible seal 160 can include a magnet member having a particular orientation of magnetic polarity. The opposing door 170 of the coach-style doors 10 can include a magnetic member 212 or an electromagnetic member 216 that can be operated between opposing north and south polarities 218, 220. When in the rest position 162, the electromagnetic member 216 can be operated to define an opposing polarity 222 with respect to the magnetic member 212 within the flexible seal 160. Through this configuration, when the front and rear doors 28, 36 are in the fully-closed position 52, the electromagnetic member 216 can be operated to define the opposing polarity 222 that magnetically draws the magnetic member 212 of the flexible seal 160 toward the opposing door 170. Through this electromagnetic connection, the flexible seal 160 is extended toward the opposing door 170 to define a sealing engagement 224 at the seam 92 defined between the front and rear doors 28, 36. When one or both of the front and rear doors 28, 36 are to be moved to the front open and rear open positions 32, 40, the electromagnetic member 216 can be operated to the reverse polarity to be a common polarity 226 of the magnetic member 212 within the flexible seal 160. Utilizing the common polarity 226, the electromagnetic member 216 repels the magnetic member 212 of the flexible seal 160 and disengages a flexible seal 160 from the opposing door 170 of the coach-style doors 10. In this configuration, the electromagnetic member 216 can be activated and deactivated to define the alternating opposing and common polarities 222, 226 to attract and repel the magnetic member 212 as necessary to define the rest and actuated positions 162, 164 of the flexible seal 160.

Typically, the electromagnetic member 216 and the magnetic member 212 will each extend the full height of the opposing front and rear doors 28, 36. Through this configuration, the flexible seal 160 can also extend the full height of each of the front and rear doors 28, 36 to seal the seam 92 defined between the front and rear doors 28, 36 in the fully-enclosed position. Typically, the electromagnetic member 216 that is positioned within the front and rear doors 28, 36 opposite the flexible seal 160 can be positioned behind a non-magnetic surface. This surface can be in the form of aluminum, fiberglass, carbon fiber, non-magnetic stainless steel, and other similar non-magnetic materials. Through this configuration, the electromagnetic member 216 can be positioned within the structure of the front and rear doors 28, 36 and the electromagnetic communication between the magnetic member 212 of the flexible seal 160 and the electromagnetic member 216 of the opposing door 170 can be placed in communication with one another when the front and rear doors 28, 36 are in the fully-closed position 52.

According to various aspects of the device, the flexible seal 160 can include a ferromagnetic member that may be attracted to a magnetic member 212 or electromagnetic member 216. In such an embodiment, the flexible seal 160 may be biased toward a retracted position 230. This retracted position 230 can be defined by the flexible seal 160 being offset from the receiving surface 172 of the opposing door 170 of the coach-style doors 10. When the front and rear doors 28, 36 are in the fully-closed position 52, the electromagnetic member 216 can be activated to attract the ferromagnetic material of the flexible seal 160. When the electromagnetic member 216 is activated, the ferromagnetic member is drawn toward the opposing door 170 of the coach-style doors 10. Through this movement of the ferromagnetic member, the flexible seal 160 is also extended toward the opposing door 170 to engage a receiving surface 172 of the opposing door 170 through the attraction of the electromagnetic member 216. When the electromagnetic member 216 is deactivated, the flexible seal 160 is returned to the retracted position 230.

According to various aspects of the device, the flexible seal 160 can be in the form of an accordion-style seal, an elastomeric flap, an elastomeric flange, or other similar elastomeric member that includes the magnetic member 212 or a ferromagnetic member therein. As discussed above, the magnetic member 212 or the ferromagnetic member can be drawn toward the electromagnetic member 216 in the opposing door 170 of the coach-style doors 10 to define a sealed seam 92 of the front and rear doors 28, 36 in the fully-closed position 52.

Figure 13:
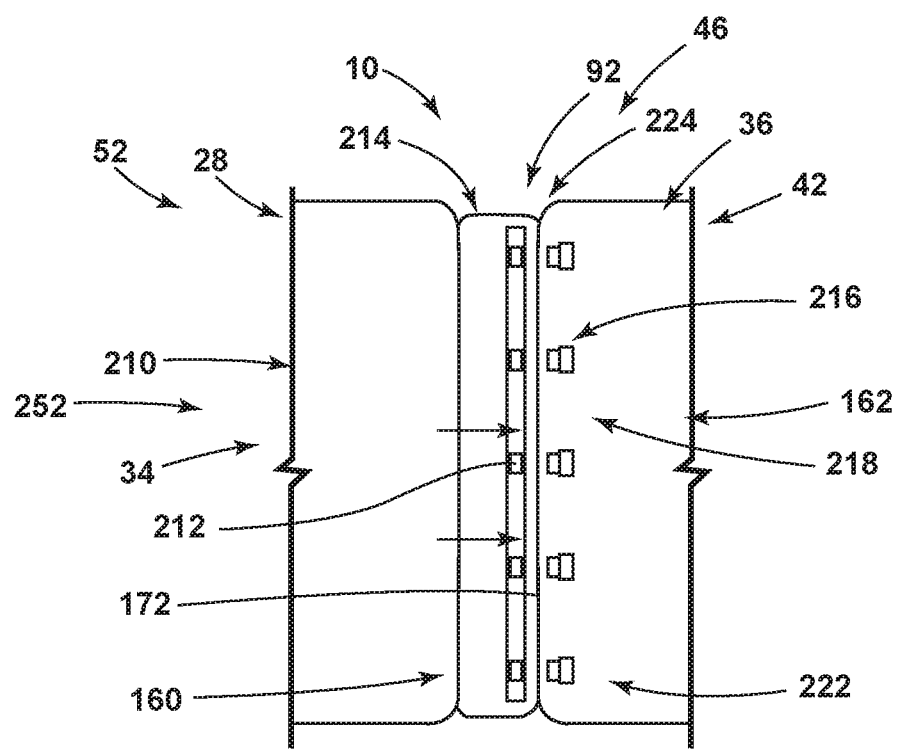
FIG. 13 is a schematic cross-sectional view of an operable magnetic seal shown in a sealed position when the doors are in a closed position.
Figure 14:
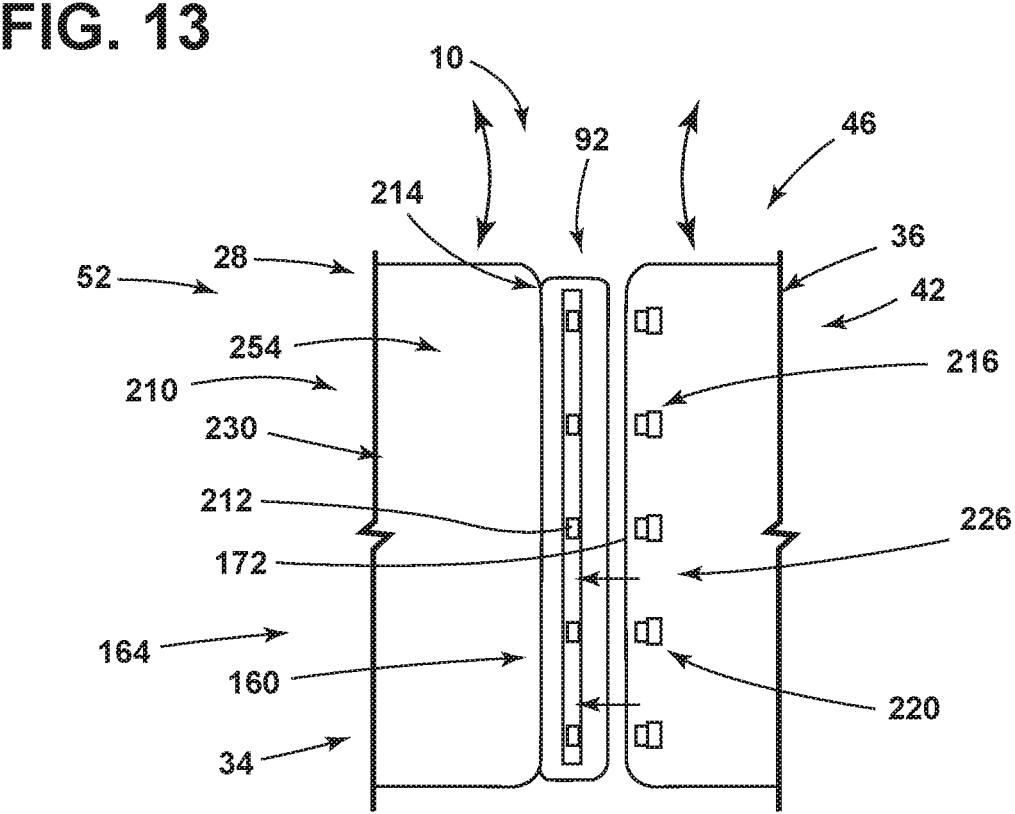
FIG. 14 is a schematic cross-sectional view of the operable magnetic sealing assembly of FIG. 13 shown in an actuated position for moving one of the front and rear doors to an open position.

Referring now to FIGS. 13 and 14, the flexible seal 160 can include a multiple individual magnetic members 212. Similarly, these magnetic members 212 can be positioned to correspond to multiple electromagnetic members 216 that are positioned within the opposing door 170 of the coach-style doors 10. Similar to the embodiment exemplified in FIGS. 11 and 12, the multiple individual electromagnetic members 216 can be operated to switch polarity between the common polarity 226 and the opposing polarity 222 with respect to the magnetic members 212 of the flexible seal 160. This switching of polarity can be accomplished by changing the direction of the electrical current that is delivered to the electromagnetic members 216. By switching polarity, the magnetic members 212 within the flexible seal 160 can be attracted or repelled, depending upon the need for the flexible seal 160 to engage the opposing door 170 or be repelled from the opposing door 170. As discussed above, when the front and rear doors 28, 36 are in the fully-closed position 52, the electromagnetic members 216 can be activated to define an opposing polarity 222 to the polarity of the magnetic members 212. Through this opposing polarity 222, the magnetic members 212 are attracted to the electromagnetic members 216. As the magnetic members 212 are attracted, the flexible seal 160 is also moved toward the surface of the opposing door 170 to define a sealing engagement 224 between the front and rear doors 28, 36 at the seam 92. When the polarity of the electromagnetic members 216 is switched, the flexible seal 160 is repelled to the retracted position 230.

Figure 15:
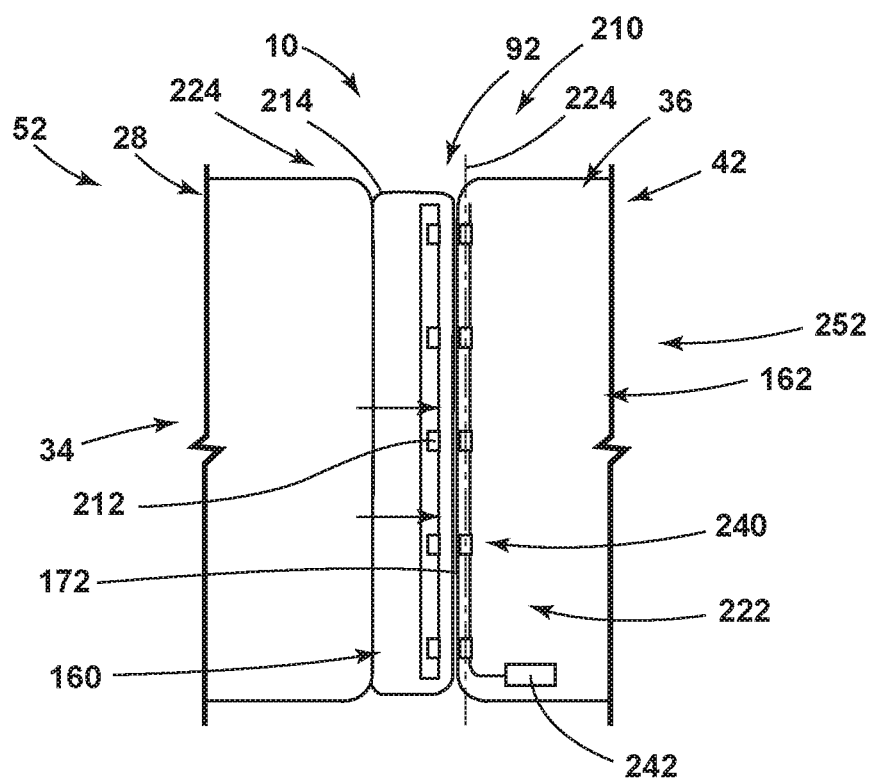
FIG. 15 is a schematic cross-sectional view of an operable magnetic seal shown in a sealed position when the doors are in a closed position.
Figure 16:
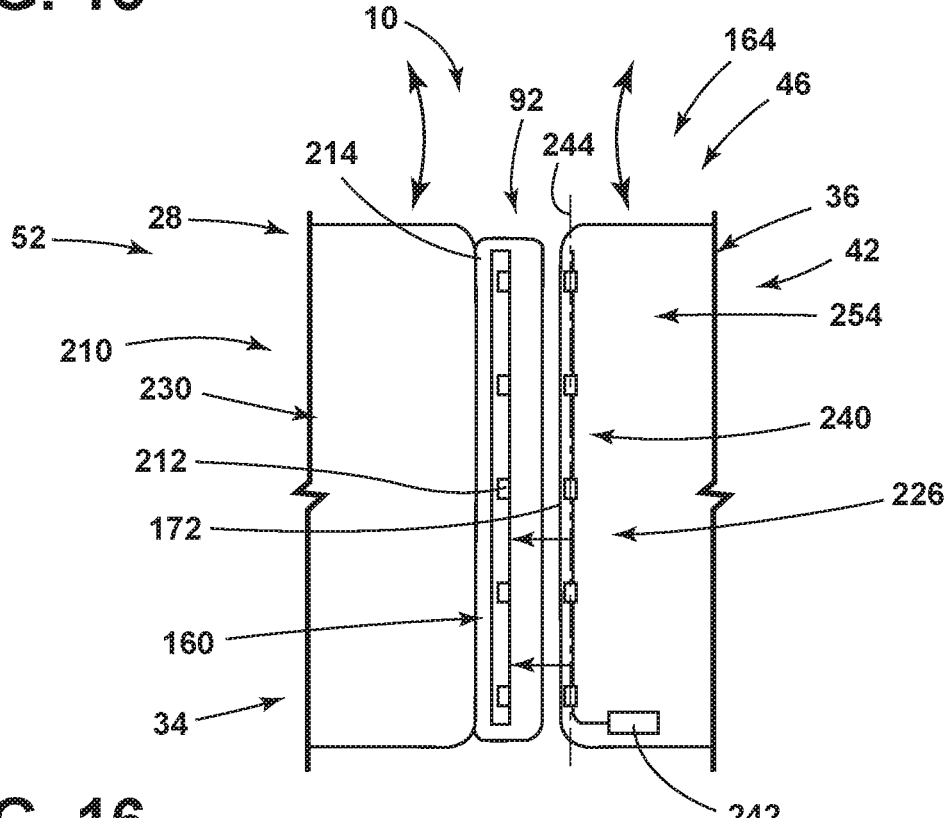
FIG. 16 is a schematic cross-sectional view of the operable magnetic sealing assembly of FIG. 15 shown in an actuated position for moving one of the front and rear doors to an open position.

As exemplified in FIGS. 15 and 16, the elongated magnet member or individual magnet members that are disposed within the flexible seal 160 can be attracted or repelled from the opposing door 170 through operable magnets 240 that can be rotated within the opposing door 170 of the coach-style doors 10. In such an embodiment, rather than an electromagnetic member 216, the opposing door 170 of the coach-style doors 10 includes operable magnets 240 that can be rotated. This rotation can be used to present an opposing polarity 222 toward the magnetic members 212, for attracting the magnetic members 212. The operable magnets 240 can also be rotated to present a common polarity 226 toward the magnetic members 212 for repelling the magnetic members 212 away from the opposing door 170 of the coach-style doors 10. These operable magnets 240 can be coupled with a driver 242 for rotating the magnetic members 212 about a rotating axis 244. In such an embodiment, the operable magnets 240 can be in the form of permanent magnets, or other similar magnetic material that can include a predictable north polarity 218 and south polarity 220. Accordingly, the north polarity 218 and south polarity 220 of the operable magnets 240 can be utilized for attracting and repelling the magnetic members 212 of the flexible seal 160.

Figure 17:
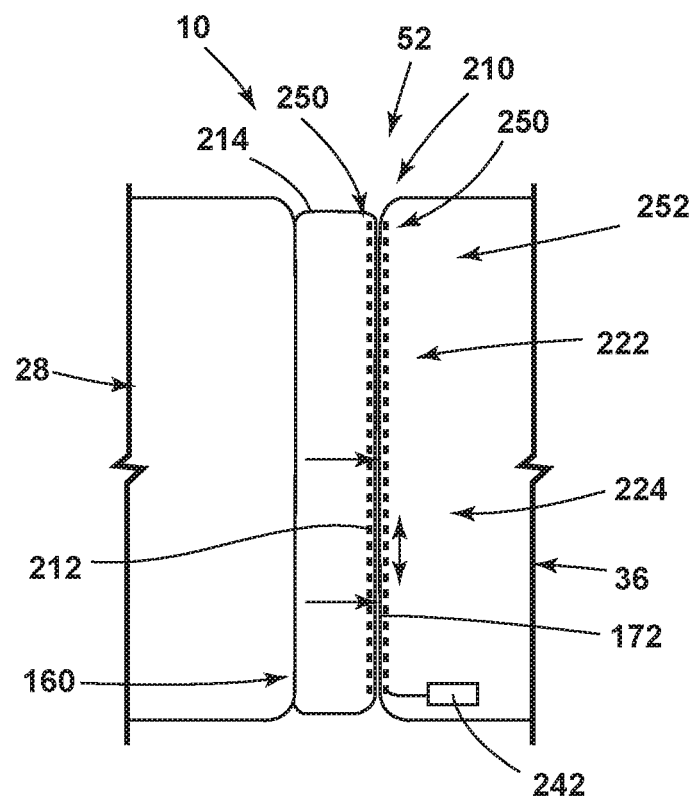
FIG. 17 is a schematic cross-sectional view of an operable magnetic seal shown in a sealed position when the doors are in a closed position.
Figure 18:
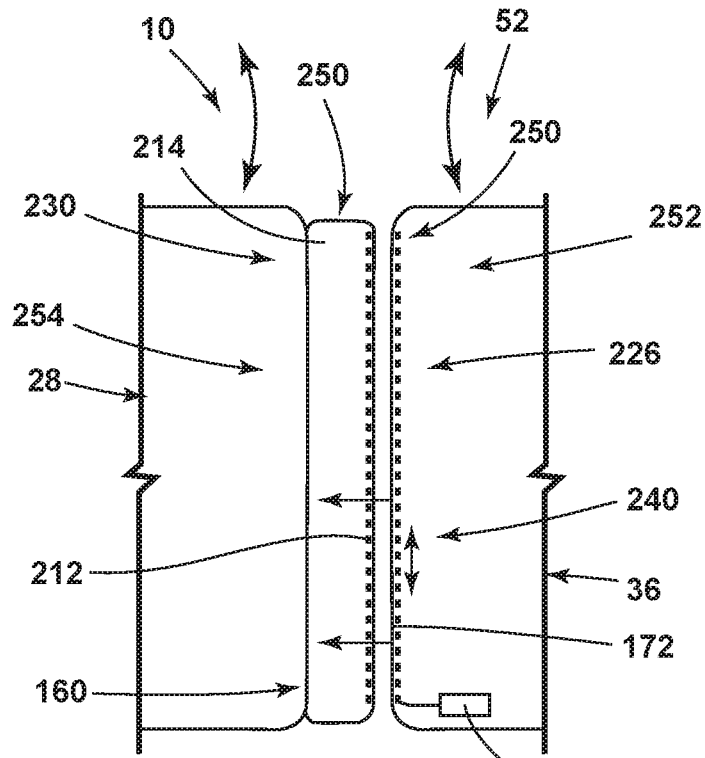
FIG. 18 is a schematic cross-sectional view of the operable magnetic sealing assembly of FIG. 17 shown in an actuated position for moving one of the front and rear doors to an open position.

Referring now to FIGS. 17 and 18, the operable magnets 240 can be placed in an alternating configuration, where each alternating operable magnet is positioned to have alternating polarities 250 presented toward the magnetic members 212 of the flexible seal 160. Similarly, the magnetic members 212 of the flexible seal 160 are similarly oriented to provide alternating polarities 250 along the length of the flexible seal 160. In this configuration, the operable magnets 240 may be linearly operable within the opposing door 170 of the coach-style doors 10. By linearly operating the operable magnets 240, the alternating polarities 250 can be moved between a rest position 162, where the alternating polarities 250 are positioned to present opposing polarities 222 in an attracting state 252, to common polarities 226, where the operable magnets 240 are positioned in a repelling state 254.

As exemplified in FIG. 17, the operable magnets 240 include the alternating north and south polarities 218, 220 along the opposing door 170 of the coach-style doors 10. These alternating north and south polarities 218, 220 are positioned to align with the magnetic members 212 so that each of the magnetic members 212 are attracted to each of the operable magnets 240 in the attracting state 252. When moved to the actuated position 164, the operable magnets 240 are operated linearly, as exemplified in FIG. 18. In this actuated position 164, the polarities of the operable magnets 240 are oriented in common polarities 226 with each of the magnetic members 212. By matching the north and south polarities 218, 220, the operable magnets 240 repel the magnetic members 212 of the flexible seal 160 to define the repelling state 254. In turn, the flexible seal 160 is repelled from the opposing door 170 to define the actuated position 164. Again, the actuated position 164 allows for movement of each of the front and rear doors 28, 36 from the fully-closed position 52 to the front open and rear open positions 32, 40, respectively.

According to various aspects of the device, the rest position 162 is indicative of an unpowered state of the various actuators 166. The rest position 162 is also indicative of a natural polarity of the various magnetic members 212 and electromagnetic members 216. The actuated position 164 is achieved when some force or power is applied to the actuator 166.

According to various aspects of the device, the flexible seal 160 that includes the magnetic members 212 can be attracted to the opposing door 170 in the rest position 162, and the opposing door 170 of the coach-style doors 10 can include an outer metallic frame 12 that receives the flexible seal 160. It is also contemplated that the opposing door 170 can include a more rigid sealing member that can be adapted to receive the flexible seal 160 in the rest position 162. The exact material of the receiving surface 172 of the opposing door 170 at the location where the flexible seal 160 is received may vary depending upon exact configuration of the vehicle 14 and the type of seal utilized at the seam 92 between the front and rear doors 28, 36.

As exemplified in FIGS. 27-30, inflatable and deflatable seals are exemplified. It is contemplated that the operation of the magnetic members 212 and the electromagnetic members 216 or operable magnets 240 can be similar in operation to the inflatable and deflatable seals. Accordingly, in the rest position 162, the flexible seal 160 is expanded to engage the opposing door 170 of the coach-style doors 10. In the actuated position 164, the flexible seal 160 is repelled from the opposing door 170 and/or retracted into a portion of the door having the flexible seal 160.

Referring now to FIGS. 19-26, various controls can be utilized for operating the latching assembly 44 and sealing assemblies 46 for the coach-style doors 10. It is contemplated that these methods can incorporate various sensors 260 for determining a position of the front and rear doors 28, 36 and the configuration of the latching assembly 44 and sealing assemblies 46 to determine whether the front and rear doors 28, 36 are open, latched, locked or in some other configuration or state with respect to the body 24 of the vehicle 14. In the various aspects of the device, a locking or unlocking step typically includes separate locking and unlocking operations that are distinct from latching and unlatching operations. In this manner, the locking and unlocking steps can be indicative of placing the door operating mechanism or door operating hardware in an operable or inoperable state. In this inoperable or locked state, the door is not capable of being opened through use of the door operating mechanism or door operating hardware. This is similar to the door hardware of a conventional vehicle door. The latching and unlatching operations may only take place when the door operating mechanism or door operating hardware are in an unlocked state or position. The latching and unlatching operations are implemented to place the front and rear doors 28, 36 in, or release the front and rear doors 28, 36 from, the respective closed positions. Accordingly, in the various methods that are disclosed, a locking or unlocking step will typically also include a latching and unlatching operation. Again, the latching and unlatching operations of the locking steps are for placing the front and rear doors 28, 36 in or releasing the front and rear doors 28, 36 from the respective closed positions. The locking and unlocking operations of the locking steps are for activating and deactivating the door operating mechanism or door operating hardware of one or more of the doors of the front and rear doors 28, 36.

Figure 19:
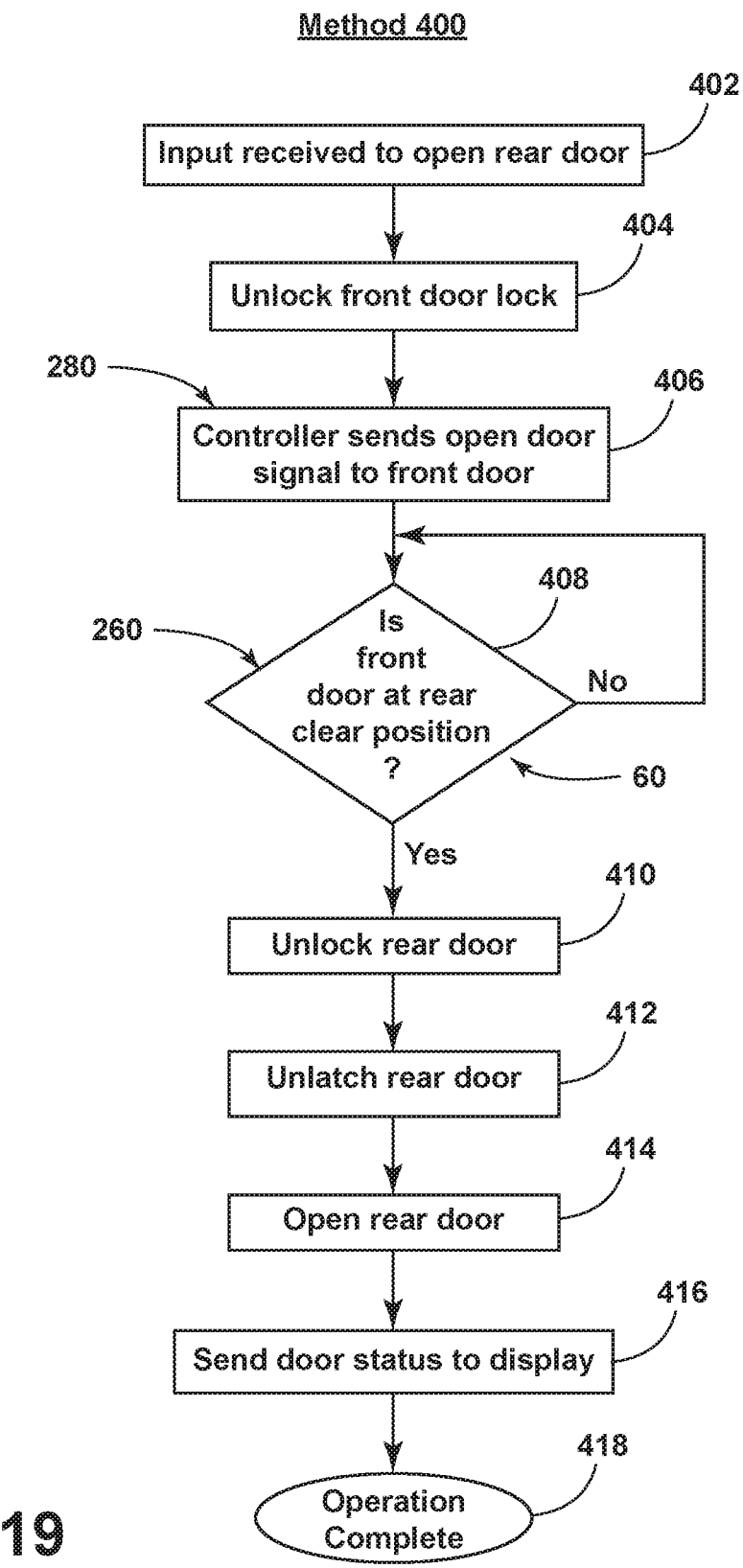
FIG. 19 is a linear flow diagram illustrating a method for opening a rear door in a coach-style configuration when the rear door is partially overlapped by the front door.
Figure 20:
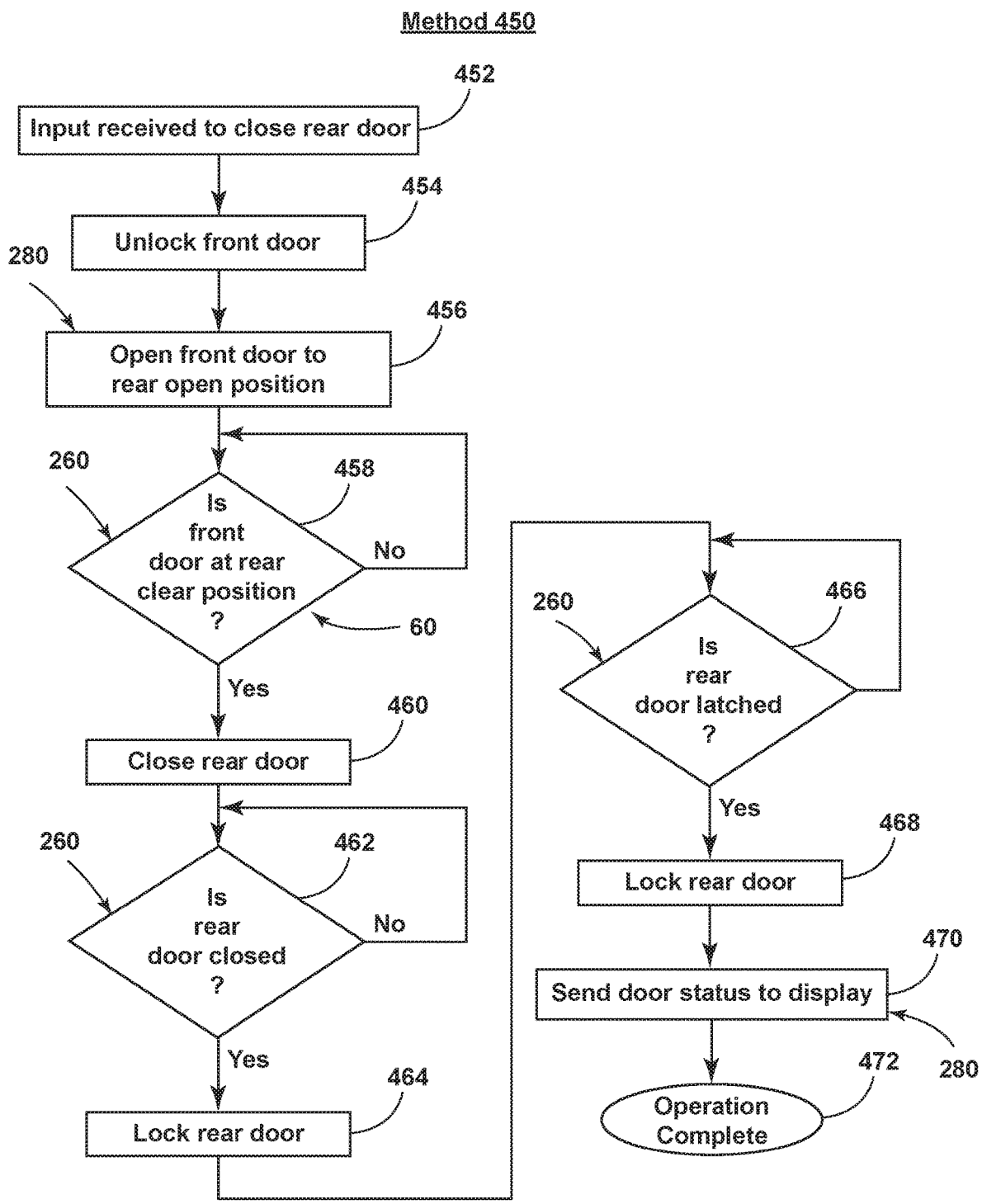
FIG. 20 is a linear flow diagram illustrating a method for closing a coach-style door when the front door partially overlaps the rear door.

As exemplified in FIGS. 19 and 20, operation of the front and rear doors 28, 36 can include an overlapping configuration where a front door 28 extends in front of a portion of a rear door 36 when the doors are in the fully-closed position 52. In this configuration, as discussed above, the front door 28 must be manipulated to allow for the rear door 36 to move to the rear open position 40. According to a method 400, step 402 includes receiving an input related to moving the rear door 36 to a rear open position 40. In the method 400, the front door 28 is moved to an unlocked state (step 404). In the method 400, a controller 280 is configured to send a rear door open signal to an operating mechanism of the front door 28 (step 406). The front door 28 is then moved to a rear door clear position 60. The controller 280 determines whether the front door 28 is in the rear door clear position 60 (step 408). Once the front door 28 is in the rear door clear position 60, the rear door 36 can be unlocked (step 410) and can also be unlatched (step 412). The rear door 36 is then opened toward the rear open position 40 (step 414). This status of the rear door 36 moving toward the rear open position 40 is then sent to a display or user interface indicating that the rear door 36 is not closed or is within the rear open position 40 (step 416). Once displayed, this is indicative of the operation of opening the rear door 36 in a door overlap design is complete (step 418).

As exemplified in FIG. 20, where the front door 28 is designed to overlap at least a portion of the rear door 36, closing the rear door 36 includes a method 450. According to this method 450, an input is received related to the rear door 36 moving to the rear closed position 42 (step 452). Typically, where the rear door 36 is independently operated, the front door 28 may be in the front closed position 34. Because the front door 28 is configured to overlap the rear door 36, the rear door 36 cannot be closed in the rear closed position 42 until such time as the front door 28 is moved to allow for such closure. According to the method 450, the front door 28 is moved to an unlocked state (step 454). The front door 28 is then moved to the rear door clear position 60 (step 456). A controller 280 determines whether the front door 28 is within the rear door clear position 60 (step 458). Once in this position, the rear door 36 can be moved to the rear closed position 42 (step 460). When in the rear closed position 42, a controller 280 determines that the rear door clear position 60 has been achieved (step 462). The front door 28 can then be moved back to the front closed position 34 and the front door 28 locked (step 464). The rear door 36, when in the rear closed position 42, can be latched (step 466) and can also be locked (step 468). The latched and locked status of the rear door 36 can then be sent to a display or user interface (step 470) and the operation can be indicated as completed when the rear door 36 is in the rear closed position 42 (step 472).

According to various aspects of the device, as exemplified in FIGS. 20-26, the various signals that are sent to the controller 280 for determining the position of the front and rear doors 28, 36 can be operated by sensors 260 that are coupled with a hinge or other rotational component of the front and rear doors 28, 36. Additionally, a latch, electrical signal, or other similar indicator can be provided to a controller 280 that is indicative of the door being moved from the closed position to an open position. By way of example, and not limitation, when the door is to be moved from the closed position to an open position, unlocking the door, operating a handle, operating a key fob or other wireless operating mechanism, or other similar signal-providing device can be used to provide a communication to the controller 280 that the front door 28 or rear door 36 are intended to be moved to the front open or rear open position 32, 40, respectively. Conversely, when the front or rear doors 28, 36 are to be moved from the open position to the ajar position 108 or a closed position, an automatic operating mechanism coupled with the front and rear doors 28, 36 can be used to communicate with a controller 280 for indicating that the doors are being moved to a closed position. Typically, when the front and rear doors 28, 36 are in a respective open position, an initial movement of the front door 28 or rear door 36 toward the respective closed position may activate a sensor 260 that indicates a rotational operation of the front and/or rear doors 28, 36. This indication of rotational movement may communicate to the controller 280 that the doors are being moved toward the front closed and/or rear closed positions 34, 42, or the ajar position 108. By receiving this indication, the controller 280 can then activate the appropriate assembly for achieving the front closed and rear closed positions 34, 42 of the doors, or the fully-closed position 52 of the front and rear doors 28, 36, or the ajar position 108 so that the latching assembly 44 can be activated.

As exemplified in FIGS. 1-26, the various sensors 260 that are utilized in operating the front and rear doors 28, 36 of the coach-style doors 10 can include various operators and sensors 260. These operating mechanisms and sensors 260 can include, but are not limited to:

Interior open and closed request buttons for operating the doors from an interior of the vehicle 14 (exterior door open/closed request buttons so that the front and rear doors 28, 36 can be operated from an exterior of the vehicle 14);

Driver door open/closed request buttons so that the front and rear doors 28, 36 can be operated by a driver 242 or operator of the vehicle 14;

Remote door input device such as a cell phone, key fob, or other similar wireless or portable communications device;

Door cleared position sensor 260 for the overlapping door configuration to indicate that the front door 28 is in the rear door clear position 60;

Door closed sensors 260 to indicate that the front door 28 or rear door 36 are in the front closed or rear closed position 34, 42 or whether both doors are in the fully-closed position 52;

Door latched sensor 260 determined if the front and rear doors 28, 36 are properly latched; door locked sensor 260 to indicate whether the front and rear doors 28, 36 are locked;

Electronic control system that includes the controller 280 for operating and/or communicating the status of the front and rear doors 28, 36;

Door seal pressure sensor 260 to determine whether the front and rear doors 28, 36 are properly sealed; door latch position to determine the status of the latching assembly 44;

Front door interim closed latch that prevents the front door 28 from closing past a safety position for allowing the rear door 36 to close first in an overlapping door configuration;

Mechanical door seal actuators 166 to provide a force to move a mechanical seal mechanism between the rest position 162 and the actuating position of the magnetic seal assembly;

Other similar sensors 260 for operating the front and rear doors 28, 36 as well as communicating the status of the front and rear doors 28, 36.

Figure 21:
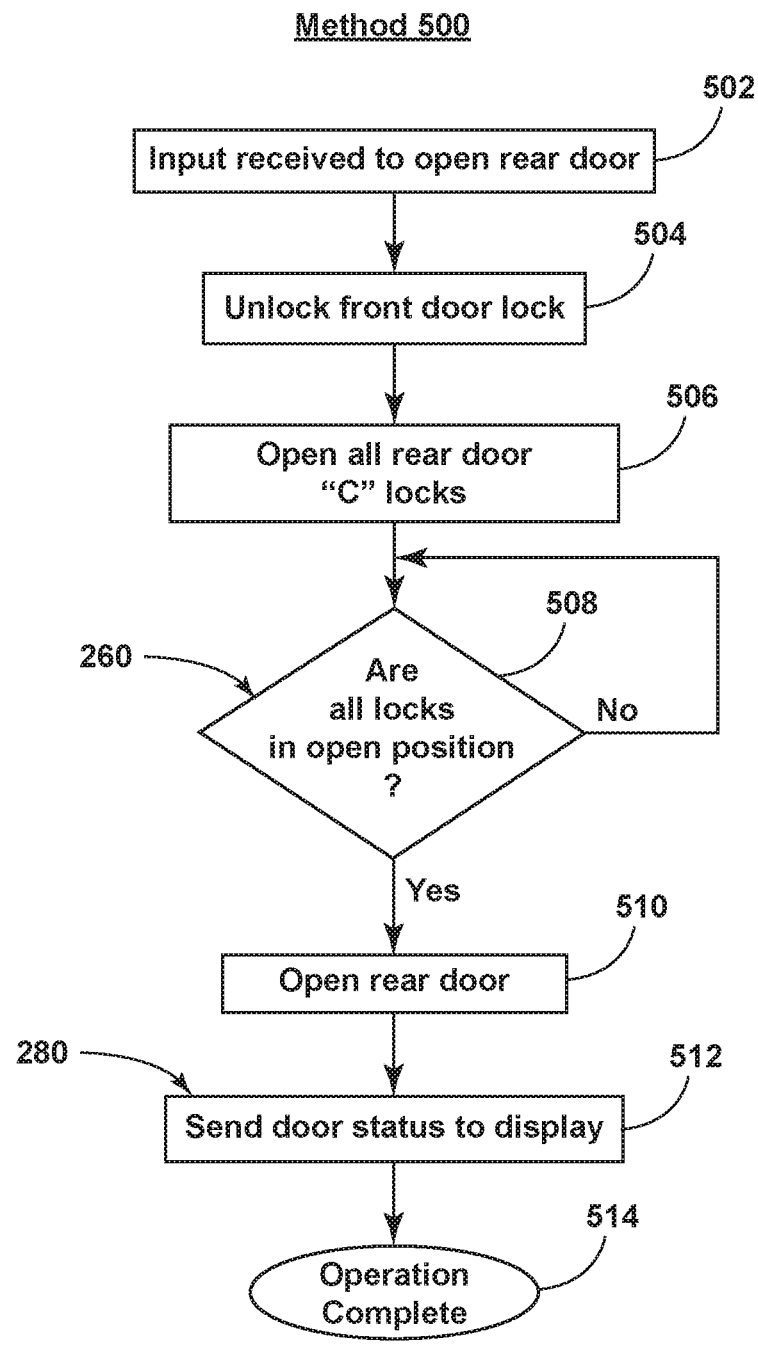
FIG. 21 is a linear flow diagram illustrating a method for opening a coach-style door using the operable latch assembly.
Figure 22:
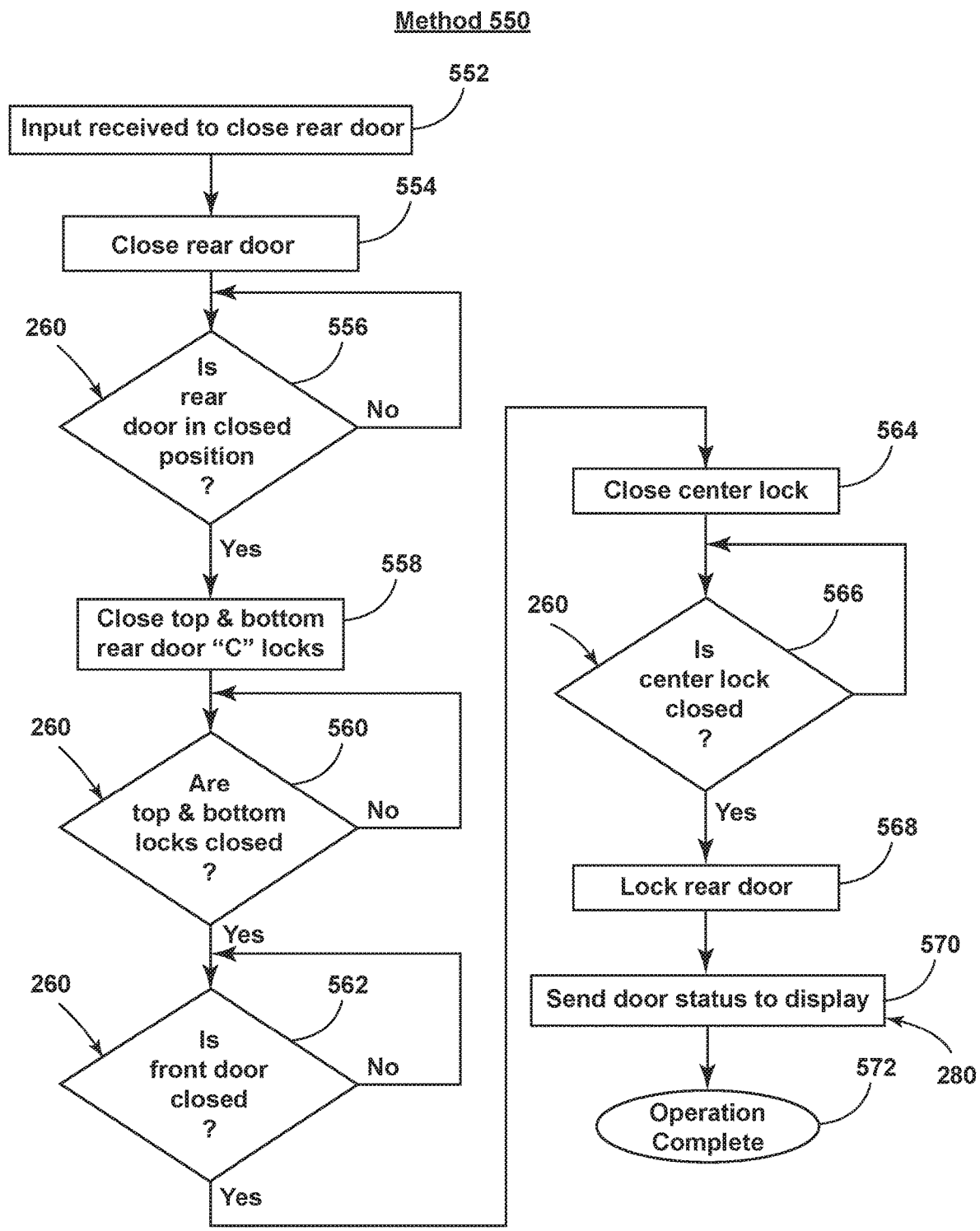
FIG. 22 is a linear flow diagram illustrating a method for closing a coach-style door using the operable latch assembly.

Referring now to FIGS. 21 and 22, a method 500 is disclosed for operating the front and rear doors 28, 36 of the coach-style doors 10 in a non-overlapping condition where each of the front and rear doors 28, 36 can be operated independently of one another. According to the method 500, an input is received indicative of the rear door 36 being moved to the rear open position 40 (step 502).

According to the method 500, the rear door 36 is then unlocked (step 504) and the various latching assemblies 44 of the rear door 36 are moved to a disengaged position 290 (step 506). As discussed above, the latching assembly 44 can be in the form of a C-shaped locking cam 80 that rotationally operates relative to a catch pin 84. A controller 280 then determines whether the one or more latching assemblies 44 are all in the disengaged position 290 (step 508). The rear door 36 can then be opened (step 510). The controller 280 then sends a status to a display or user interface within the vehicle 14 indicating that the rear door 36 is either not in the rear closed position 42 or the rear door 36 is in the rear open position 40 (step 512). This operation is then indicated as being complete (step 514).

As exemplified in FIG. 22, a method 550 illustrates closing the rear door 36 after the method 500 has been completed. According to the method 550, an input is received with respect to the rear door 36 being moved to the rear closed position 42 (step 552). The rear door 36 is then moved to the rear closed position 42 (step 554). A controller 280 determines that the rear door 36 is in the rear closed position 42 (step 556). The latching assembly 44 at the top and bottom edges 70, 72 of the side aperture 26 are then activated to a latching position (step 558) and the controller 280 determines that the latching assembly 44 are in a latching position (step 560). The controller 280 can then determine whether the front door 28 is also in the front closed position 34 (step 562). If each of the front and rear doors 28, 36 are in the fully-closed position 52, the center latching assembly 44, typically the door securing latch 90, can then be moved to a latching position (step 564) and a control unit determines that a latching position of the center latching assembly 44 is achieved (step 566). The rear door 36 can then be locked (step 568) and the controller 280 sends a status of the rear door 36 to a display or user interface indicating that the rear door 36 is in the closed, latched and locked position 140 (step 570). This operation is then indicated as being complete (step 572).

Figure 23:
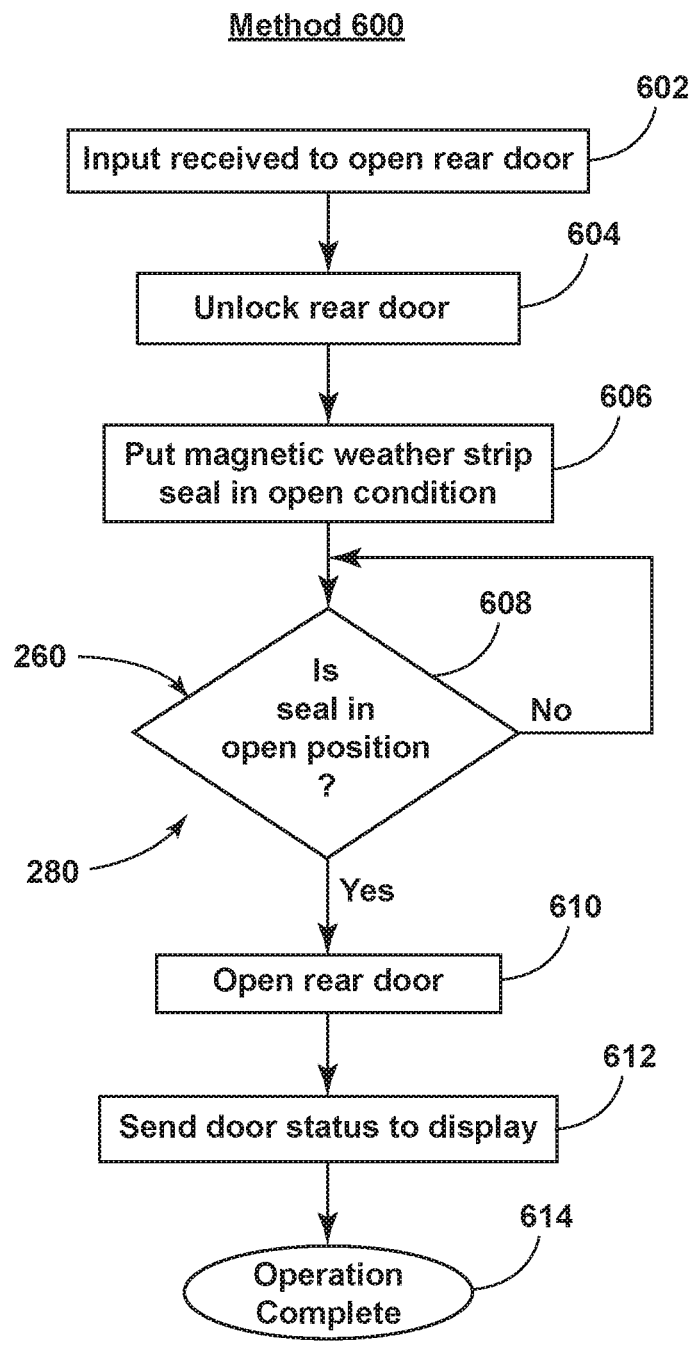
FIG. 23 is a linear flow diagram illustrating a method for opening a coach-style door using a magnetic seal to seal the coach-style doors.

Referring now to FIG. 23, a method 600 is disclosed for operating a sealing assembly 46 as one of the front or rear doors 28, 36 is being moved to a respective open position. According to the method 600, an input is received relative to the rear door 36 being moved to the rear open position 40 (step 602). The rear door 36 is then unlocked (step 604) and the magnetic sealing mechanism is moved to the actuated position 164 (step 606). As discussed above, the actuated position 164 of the magnetic sealing assembly 210 is indicative of the flexible seal 160 being repelled from the opposing door 170 of the coach-style doors 10. A controller 280 then determines whether the flexible seal 160 is in the actuated position 164 and separated from the opposing door 170 (step 608). The rear door 36 can then be moved to the rear open position 40 (step 610) and the controller 280 sends a status of the rear door 36 to a display or user interface indicative of the rear door 36 being in the rear open position 40 (step 612). This operation is then indicated as being complete (step 614).

Figure 24:
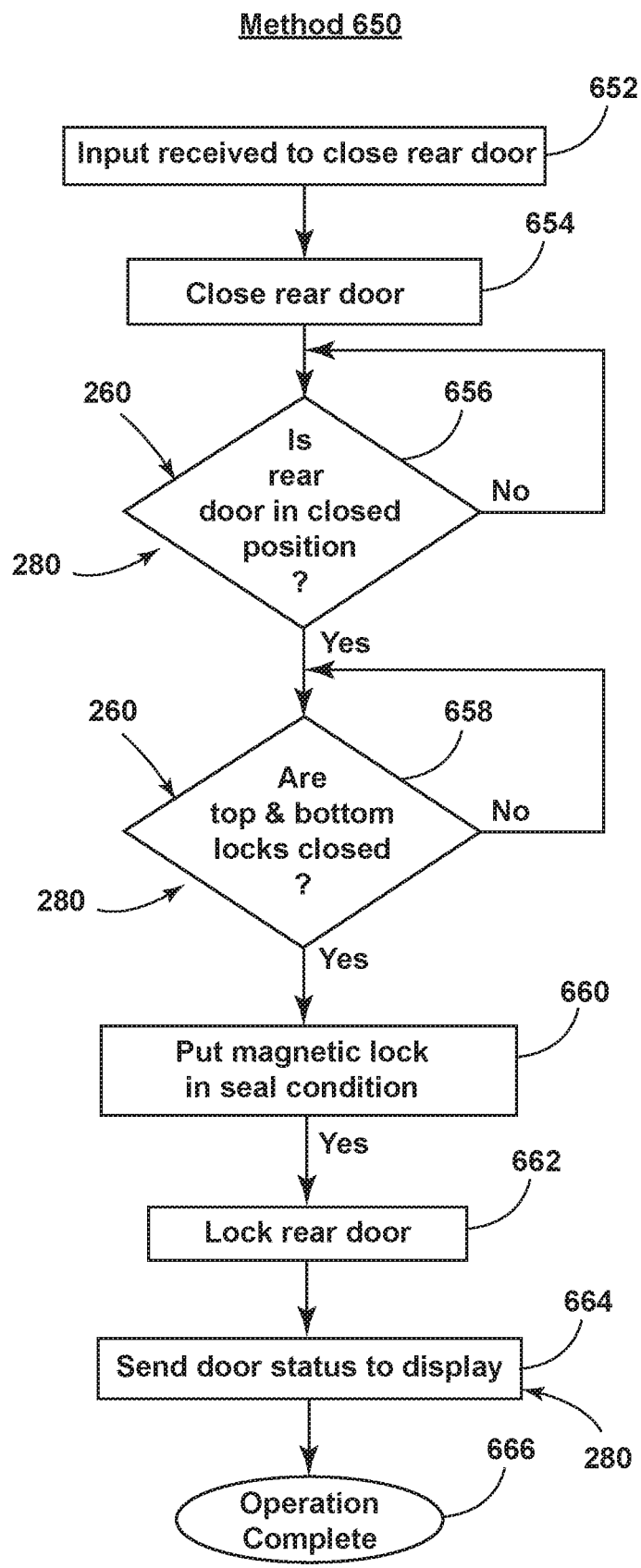
FIG. 24 is a linear flow diagram illustrating a method for closing and sealing coach-style doors using an operable magnetic seal.

As exemplified in FIG. 24, a method 650 is illustrated for operating a magnetic sealing assembly 210 when the rear door 36 is being moved to a rear closed position 42. According to the method 650, an input is received relative to the rear door 36 being moved into the rear closed position 42 (step 652). The rear door 36 is then moved into the rear closed position 42 (step 654) and the controller 280 indicates whether the rear door 36 is in fact in this rear closed position 42 (step 656). The controller 280 then determines whether the front door 28 is in the closed and latched position 106 (step 658). If each of the front and rear doors 28, 36 are in the fully-closed position 52, the magnetic sealing assembly 210 is operated to the rest position 162 (step 660). As discussed above, the rest position 162 of the magnetic sealing assembly 210 is indicative of the seal being attracted to the receiving surface 172 of the opposing door 170 through the application of electromagnetic members 216 or operable magnets 240 disposed within the opposing door 170. The rear door 36 can then be locked (step 662) and the status of the rear door 36 in the rear closed position 42 is sent to a display or user interface (step 664). The operation is then indicated as being complete (step 666).

Figure 25:
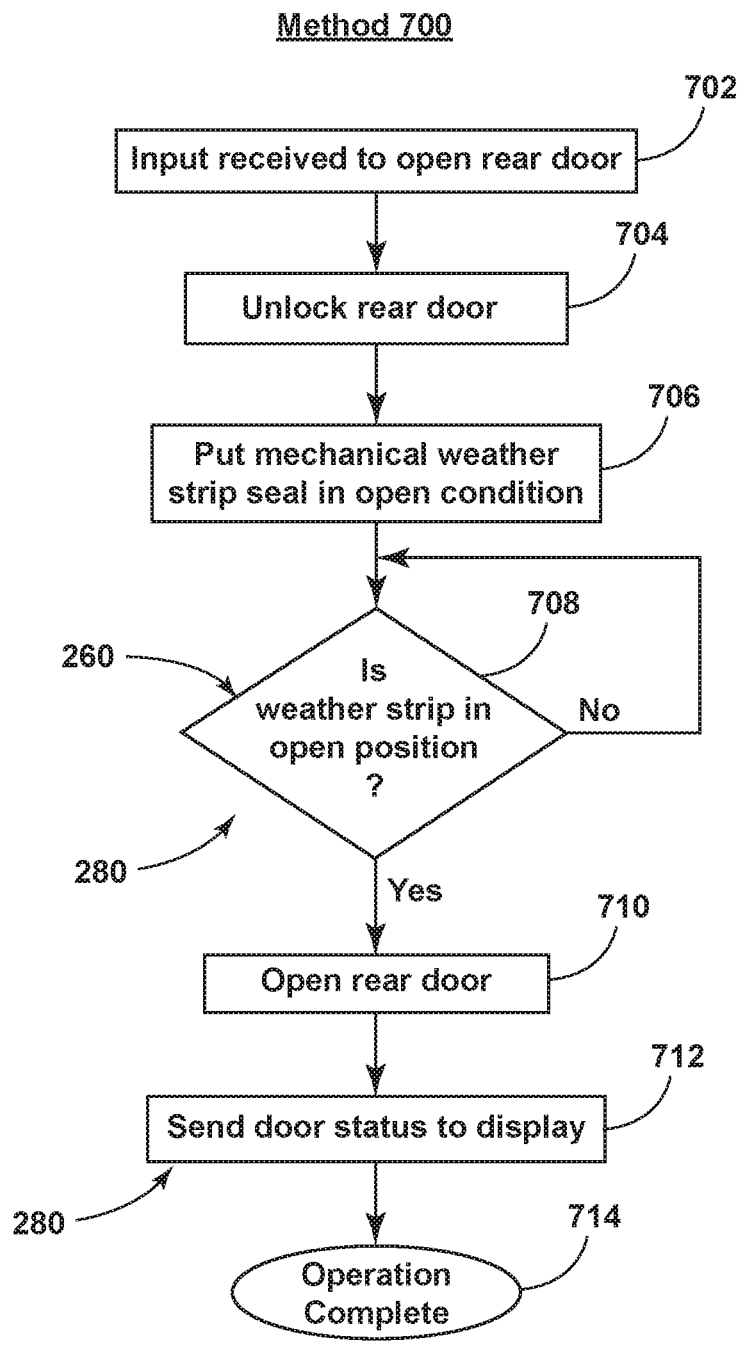
FIG. 25 is a linear flow diagram illustrating a method for unsealing and opening a coach-style door utilizing a mechanical sealing mechanism.

Referring now to FIG. 25, a method 700 is disclosed for operating a mechanical sealing assembly 292 when the rear door 36 is moved into a rear open position 40. According to the method 700, an input is received with respect to the rear door 36 being moved to the rear open position 40 (step 702). The rear door 36 is then unlocked (step 704) and the mechanical sealing assembly 292 is moved to the actuated position 164 (step 706). The controller 280 determines whether the mechanical sealing assembly 292 is in the actuated position 164 (step 708). The rear door 36 can then be opened (step 710) and the controller 280 sends a status to a display or user interface that indicates whether the rear door 36 is in the rear open position 40 (step 712). This operation is then indicated as being complete (step 714).

Figure 26:
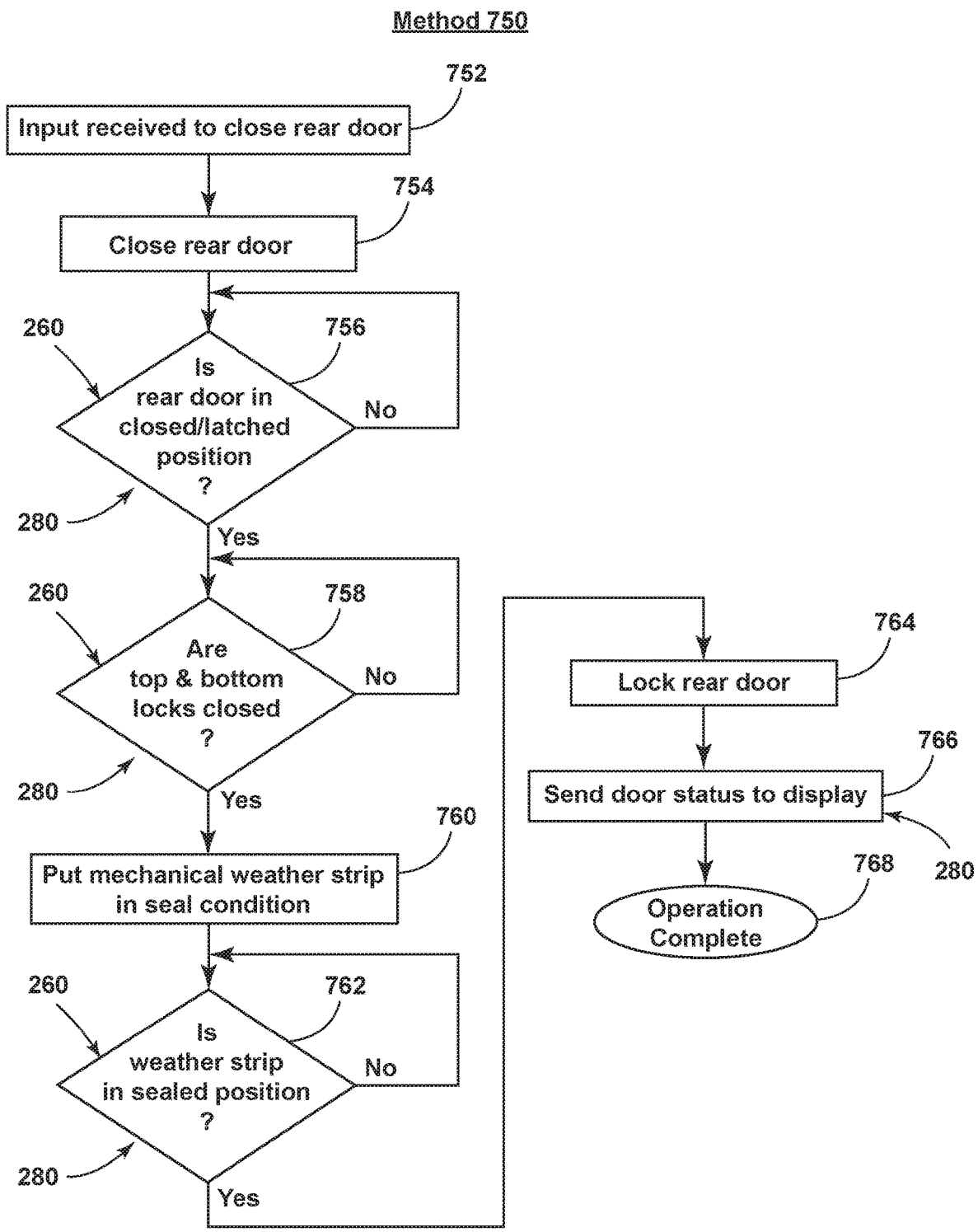
FIG. 26 is a linear flow diagram illustrating a method for closing and sealing coach-style doors using an operable mechanical sealing mechanism.
Figure 27:
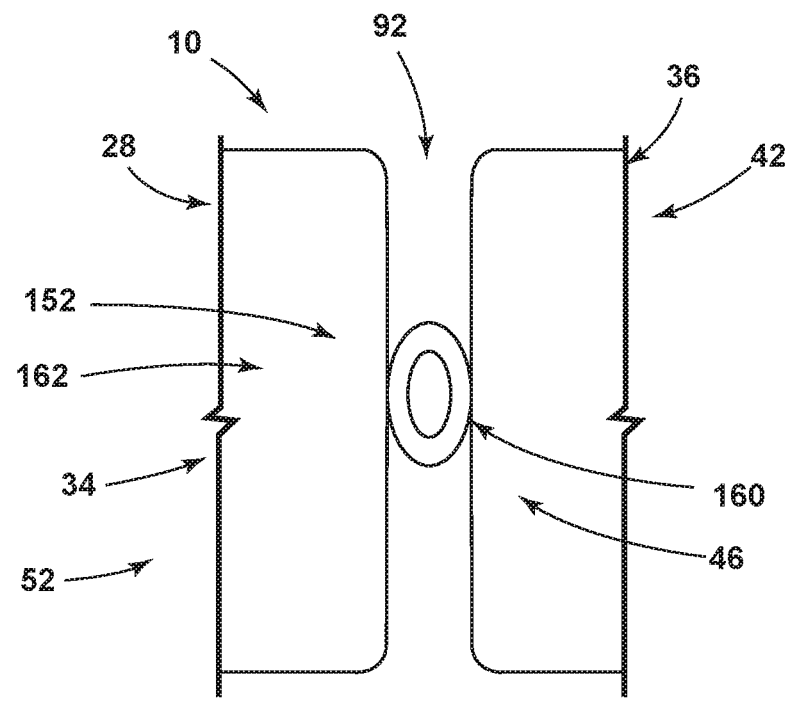
FIG. 27 is a schematic cross-sectional view of an operable weather seal shown in a rest position.
Figure 28:
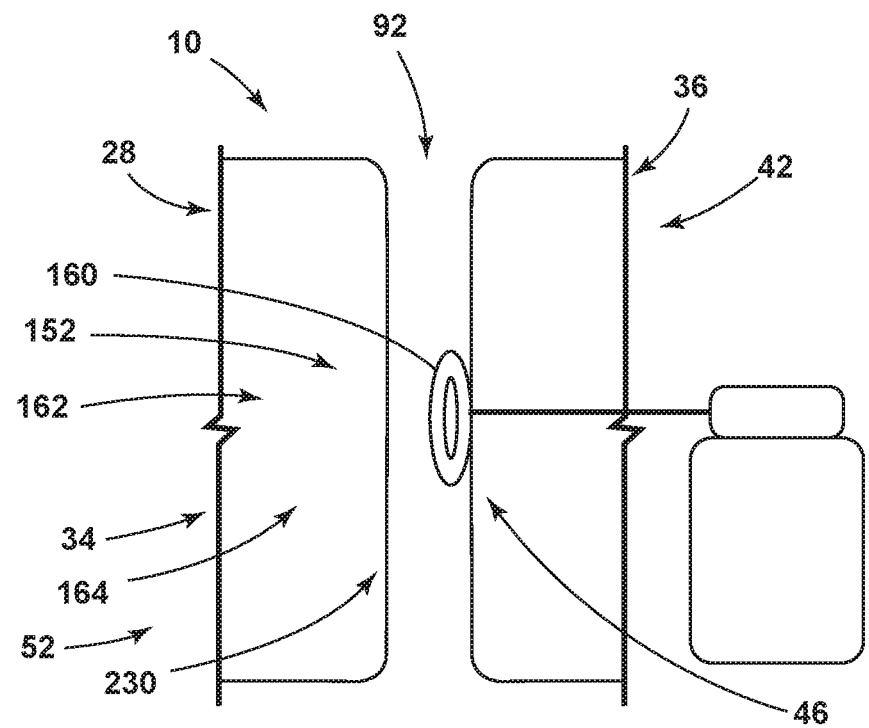
FIG. 28 is a schematic cross-sectional view of the inflatable seal of FIG. 27 shown in a retracted position.
Figure 29:
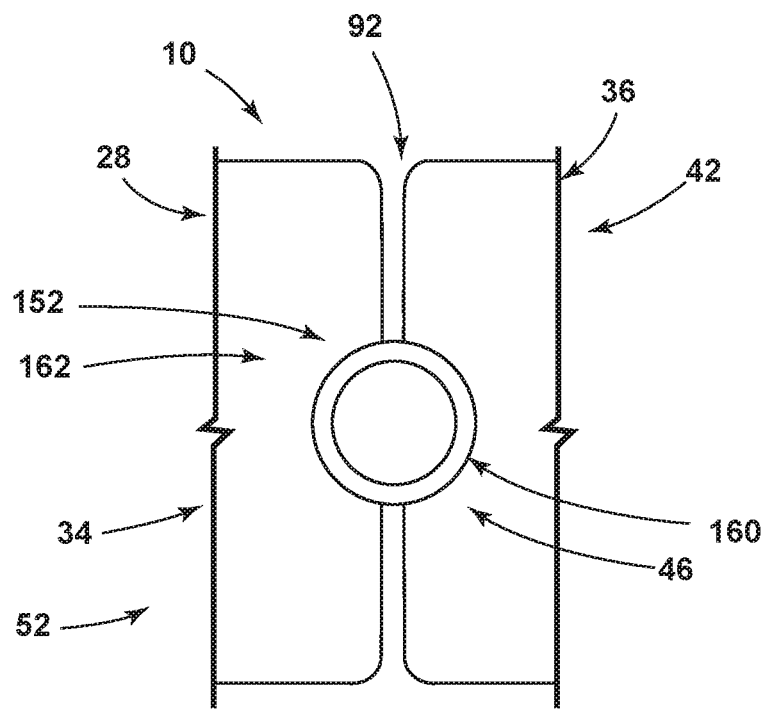
FIG. 29 is a schematic cross-sectional view of an inflatable sealing member shown in a rest position.
Figure 30:
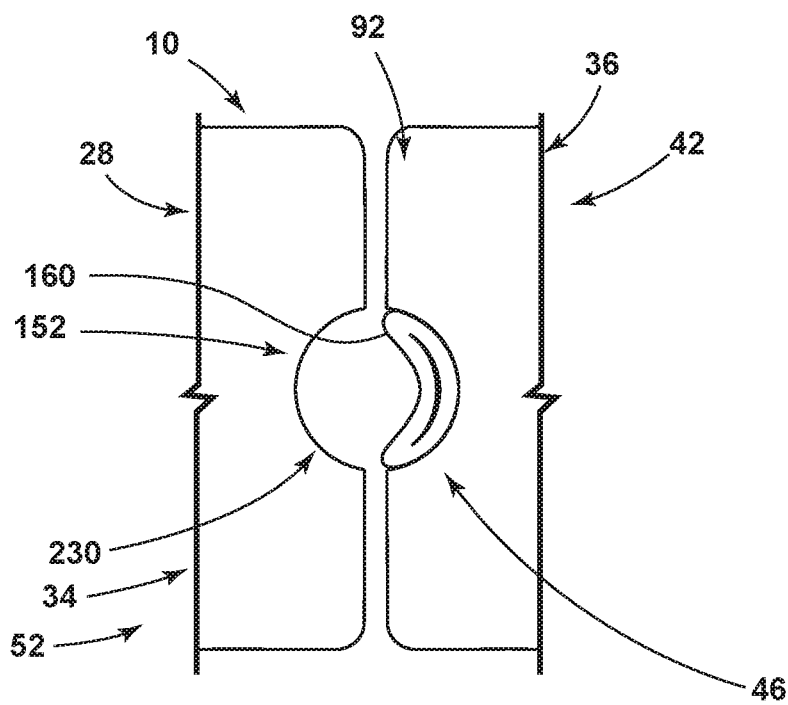
FIG. 30 is a cross-sectional schematic view of the inflatable sealing member in retracted position.

As exemplified in FIG. 26, a method 750 is disclosed for operating a rear door 36 to a rear closed position 42 and utilizing a mechanical sealing assembly 292. According to the method 750, an input is received related to the rear door 36 being moved to the rear closed position 42 (step 752). The rear door 36 can then be moved to the rear closed positon (step 754) and a controller 280 determines whether the rear door 36 is in the rear closed position 42 and the latched position 106 (step 756). The controller 280 then determines whether the front door 28 is also in the latched position 106 (step 758). The mechanical sealing assembly 292 is then activated to a rest position 162 so that the flexible seal 160 is engaged with the opposing door 170 (step 760). The controller 280 then determines whether the mechanical sealing assembly 292 has been moved to the rest position 162 (step 762). The rear door 36 can then be locked (step 764) and the controller 280 sends a status of the rear door 36 to a display or user interface of the vehicle 14 indicating that the rear door 36 is in the rear closed position 42 (step 766). This operation can then be indicated as completed (step 768).

It should be understood that the methods 400-750 can be modified based upon the exact configuration of the front and rear doors 28, 36, the configuration of the sealing assembly 46 and the configuration of the latching assembly 44. Again, the operation of these methods 400-750 is typically accomplished through various manual operating mechanisms (such as handles) and various automated processes and sensors 260, as described above.

According to various aspects of the device, the apparatus and methods described herein can be used within various vehicles. Such vehicles can include, but are not limited to, luxury sedans, pick-up trucks, cargo vehicles, or other similar vehicle configurations having opposite hinged doors that close at a single continuous opening within the frame of the vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a body having an uninterrupted side aperture that provides access to an interior passenger cabin;
   a front door hingedly attached at a forward edge of the uninterrupted side aperture, the front door selectively operable between front open and front closed positions;
   a rear door hingedly attached at a rearward edge of the uninterrupted side aperture, the rear door selectively operable between rear open and rear closed positions;
   a latching assembly at least partially positioned within the body and configured to receive the front door in the front closed position and the rear door in the rear closed position, the latching assembly selectively engaging the front door at a top edge and a bottom edge of the uninterrupted side aperture and selectively engaging the rear door at the top edge of the edge of the uninterrupted side aperture, the latching assembly also including a locking cam that selectively secures the front door to the rear door; and
   a sealing assembly defined between a forward seal of the rear door and a rearward seal of the front door proximate the locking cam, where the forward and rearward seals engage one another in a fully-closed position.

2. The vehicle of claim 1, wherein the front door is operable between the front open and front closed positions when the rear door is in the rear closed position.

3. The vehicle of claim 2, wherein the rear door is operable between the rear open and rear closed positions when the front door is in the front closed position.

4. The vehicle of claim 1, wherein the latching assembly is further defined within the forward edge of the rear door and the rearward edge of the front door.

5. The vehicle of claim 1, wherein the sealing assembly includes an operable member that articulates toward a receiving seal to define the fully-closed position.

6. The vehicle of claim 5, wherein the operable member is operated by a mechanical assembly.

7. The vehicle of claim 5, wherein the operable member is operated by a magnetic assembly.

8. The vehicle of claim 1, wherein the sealing assembly includes opposing elastomeric seals that are attached to the front and rear doors, respectively.

9. The vehicle of claim 1, wherein the front and rear doors are operated by a door operating mechanism that operates the front door, the rear door and the latching assembly between an ajar position and the fully-closed position.

10. The vehicle of claim 9, wherein the ajar position is approximately 5 degrees rotationally distal from the fully-closed position.

11. The vehicle of claim 9, wherein the door operating mechanism includes the latching assembly.

12. A vehicle comprising:
    a body having an uninterrupted side aperture that provides access to an interior passenger cabin;
    a front door operably attached at a forward portion of the uninterrupted side aperture, the front door selectively operable between front open and front closed positions;
    a rear door operably attached at a rearward portion of the uninterrupted side aperture, the rear door selectively operable between rear open and rear closed positions;
    a latching assembly at least partially positioned within the body and configured to receive the front door in the front closed position and the rear door in the rear closed position, the latching assembly selectively engaging the front door at a top edge and a bottom edge of the uninterrupted side aperture and selectively engaging the rear door at the top edge and the bottom edge of the uninterrupted side aperture; and
    a sealing assembly defined between a forward seal of the rear door and a rearward seal of the front door, where the forward and rearward seals engage one another in a fully-closed position, wherein one of the forward and rearward seals includes a flexible seal and an actuator that deforms and extends the flexible seal toward a weatherstrip of the other of the forward and rearward seals, the actuator being disposed within the respective door of the front and rear doors and the flexible seal enclosing and concealing the actuator within the respective door.

13. The vehicle of claim 12, wherein the front door is rotationally coupled with a forward edge of the uninterrupted side aperture.

14. The vehicle of claim 12, wherein each of the front and rear doors are independently and selectively operable between the front open and front closed positions and the rear open and rear closed positions, respectively.

15. The vehicle of claim 12, wherein the sealing assembly includes an operable member that articulates toward a receiving seal to define the fully-closed position.

16. The vehicle of claim 15, wherein the operable member is at least partially operated by a mechanical assembly disposed within one of the front and rear doors.

17. The vehicle of claim 15, wherein the operable member is at least partially operated by a magnetic assembly disposed within one of the front and rear doors.

18. A vehicle comprising:
    a body having an uninterrupted side aperture that provides access to an interior passenger cabin;
    a front door hingedly attached at a forward edge of the uninterrupted side aperture, the front door selectively operable between front open and front closed positions;
    a rear door operably attached at a rearward portion of the uninterrupted side aperture, the rear door selectively operable between rear open and rear closed positions;
    a latching assembly positioned within the body and the front and rear doors, the latching assembly operable to receive the front door in the front closed position and the rear door in the rear closed position, the latching assembly selectively engaging the front door at a top edge and a bottom edge of the uninterrupted side aperture and selectively engaging the rear door at the top edge and the bottom edge of the uninterrupted side aperture; and a sealing assembly defined between a forward seal of the rear door and a rearward seal of the front door, where the forward and rearward seals engage one another in a fully-closed position, wherein the latching assembly further includes a locking cam that selectively engages the front door and the rear door together in the front closed and the rear closed positions, wherein the latching assembly selectively operates the front and rear doors between respective ajar positions and the fully-closed position, wherein one of the forward and the rearward seals includes a flexible seal and an actuator that deforms and extends the flexible seal toward a receiving seal of the other of the forward and rearward seals, the actuator being disposed within the respective door of the front and rear doors and the flexible seal enclosing and concealing the actuator within the respective door.

19. The vehicle of claim 18, wherein each of the front and rear doors are independently and selectively operable between the front open and front closed positions and the rear open and rear closed positions, respectively.

20. The vehicle of claim 12, wherein the sealing assembly includes an operable member that articulates toward the receiving seal to define the fully-closed position, and wherein the operable member is operated by at least one of a mechanical assembly and a magnetic assembly, and wherein the operable member is disposed within the rear door.

* * * * *

UNITED STATES PATENT AND TRADEMARK OFFICE
CERTIFICATE OF CORRECTION

PATENT NO. : 11,525,291 B2
APPLICATION NO. : 16/775879
DATED : December 13, 2022
INVENTOR(S) : Salter et al.

It is certified that error appears in the above-identified patent and that said Letters Patent is hereby corrected as shown below:

In the Claims

Column 19:
Claim 1, Line 37;
Delete "top edge of the edge" and insert --top edge and the bottom edge--.

Signed and Sealed this
Fourteenth Day of February, 2023

*Katherine Kelly Vidal*
Director of the United States Patent and Trademark Office